(12) United States Patent
Van Straten

(10) Patent No.: US 11,142,114 B2
(45) Date of Patent: *Oct. 12, 2021

(54) ILLUMINATION ASSEMBLY AND EMITTER ASSEMBLY

(71) Applicant: George A. Van Straten, Chassell, MI (US)

(72) Inventor: George A. Van Straten, Chassell, MI (US)

(73) Assignee: Van Straten Enterprises, Inc., Chassell, MI (US)

( * ) Notice: Subject to any disclaimer, the term of this patent is extended or adjusted under 35 U.S.C. 154(b) by 115 days.

This patent is subject to a terminal disclaimer.

(21) Appl. No.: 16/277,860

(22) Filed: Feb. 15, 2019

(65) Prior Publication Data

US 2019/0176680 A1 Jun. 13, 2019

Related U.S. Application Data

(63) Continuation of application No. 15/660,843, filed on Jul. 26, 2017, now Pat. No. 10,272,818, which is a (Continued)

(51) Int. Cl.
| | |
|---|---|
| *H05B 3/06* | (2006.01) |
| *H05B 3/40* | (2006.01) |
| *H05B 3/84* | (2006.01) |
| *B60S 1/02* | (2006.01) |
| *B60Q 1/04* | (2006.01) |

(Continued)

(52) U.S. Cl.
CPC ......... *B60Q 1/0005* (2013.01); *B60Q 1/0017* (2013.01); *B60Q 1/04* (2013.01); *F21S 41/153* (2018.01); *F21S 45/60* (2018.01); *H05B 3/06* (2013.01); *H05B 3/40* (2013.01);
(Continued)

(58) Field of Classification Search
None
See application file for complete search history.

(56) References Cited

U.S. PATENT DOCUMENTS

| | | | | |
|---|---|---|---|---|
| 4,086,467 A | * | 4/1978 | Grant | H05B 3/141 |
| | | | | 219/505 |
| 4,147,927 A | * | 4/1979 | Pirotte | A45D 1/28 |
| | | | | 219/541 |

(Continued)

FOREIGN PATENT DOCUMENTS

| | | | | |
|---|---|---|---|---|
| WO | WO-2015106024 A1 | * | 7/2015 | F21V 29/90 |

*Primary Examiner* — Joseph M. Pelham
(74) *Attorney, Agent, or Firm* — Keith D. Grzelak; Wells St. John P.S.

(57) ABSTRACT

A heated light enclosure having an adaptable heating system is provided with a controlled heating system to deliver enough heat to a lens on a lamp assembly to remove snow, frost, and/or condensation without overheating the lens. By heating the lens using a combination of one or more of PTC heaters, heat sinks and heat pipes, accumulation of snow, ice, or vapor is mitigated or eliminated from a surface of the lens, thereby enabling light to transmit through the lens. Applications include lamps and bulbs on conveyance devices, including vehicles, boats, planes, and trains, as well as sedentary structures, such as lamp posts, street lights, railroad crossing markers and lights, and airport ground and runway lighting systems.

33 Claims, 29 Drawing Sheets

Related U.S. Application Data continuation of application No. 14/827,176, filed on Aug. 14, 2015, now Pat. No. 10,046,692.

(60) Provisional application No. 62/135,060, filed on Mar. 18, 2015, provisional application No. 62/037,430, filed on Aug. 14, 2014.

(51) Int. Cl.
  *B60Q 1/00* (2006.01)
  *F21S 45/60* (2018.01)
  *F21S 41/153* (2018.01)
  *B60S 1/60* (2006.01)

(52) U.S. Cl.
  CPC ............... *H05B 3/84* (2013.01); *B60S 1/603* (2013.01); *H05B 2203/02* (2013.01)

(56) References Cited

U.S. PATENT DOCUMENTS

| | | | | |
|---|---|---|---|---|
| 4,282,003 A * | 8/1981 | Yashin | H01C 1/024 | 174/549 |
| 4,395,623 A * | 7/1983 | Shimada | H05B 3/141 | 219/505 |
| 4,822,980 A * | 4/1989 | Carbone | H05B 3/141 | 219/205 |
| 4,870,249 A * | 9/1989 | Kayanuma | F02M 31/135 | 219/206 |
| 6,180,930 B1 * | 1/2001 | Wu | F24H 3/0429 | 219/530 |
| 6,601,983 B1 * | 8/2003 | Runfola | B60S 1/026 | 362/545 |
| 6,982,400 B1 * | 1/2006 | Nguon | H05B 3/06 | 219/544 |
| 7,281,811 B2 * | 10/2007 | Thuot Rann | A61L 9/037 | 219/220 |
| 7,914,162 B1 * | 3/2011 | Huang | F21V 3/04 | 362/92 |
| 8,314,559 B1 * | 11/2012 | Helms | F21S 43/14 | 315/82 |
| 8,399,805 B2 * | 3/2013 | Biddell | A42B 3/245 | 219/203 |
| 9,623,790 B2 * | 4/2017 | Van Straten | F21S 8/085 | |
| 2006/0245202 A1 * | 11/2006 | Moreth | F21S 45/37 | 362/547 |
| 2006/0289464 A1 * | 12/2006 | von der Luhe | H05B 3/50 | 219/505 |
| 2007/0181565 A1 * | 8/2007 | Murahashi | H05B 3/84 | 219/629 |
| 2010/0006554 A1 * | 1/2010 | Inoue | F21S 41/148 | 219/202 |
| 2010/0008099 A1 * | 1/2010 | Inoue | F21S 45/60 | 362/520 |
| 2011/0228529 A1 * | 9/2011 | Patel | F21V 23/009 | 362/235 |
| 2012/0175149 A1 * | 7/2012 | Ihle | H05B 3/40 | 174/212 |
| 2012/0201031 A1 * | 8/2012 | Marley | F21S 41/28 | 362/294 |
| 2013/0043234 A1 * | 2/2013 | Tsai | H05B 3/84 | 219/220 |
| 2013/0114279 A1 * | 5/2013 | Marley | F21S 41/143 | 362/516 |
| 2013/0249375 A1 * | 9/2013 | Panagotacos | F21V 23/005 | 313/13 |
| 2014/0184075 A1 * | 7/2014 | Ter-Hovhannissian | F21V 23/0471 | 315/114 |
| 2014/0334170 A1 * | 11/2014 | Zhong | F21S 41/192 | 362/487 |
| 2015/0034621 A1 * | 2/2015 | Timmermann | B60R 11/04 | 219/203 |
| 2015/0055363 A1 * | 2/2015 | Van Straten | B60Q 1/0005 | 362/520 |
| 2015/0055944 A1 * | 2/2015 | Van Straten | H05B 3/16 | 392/426 |
| 2015/0276163 A1 * | 10/2015 | Singh | F21S 45/60 | 362/516 |
| 2015/0369445 A1 * | 12/2015 | Orr | F21S 45/60 | 362/516 |
| 2016/0046262 A1 * | 2/2016 | Van Straten | B60Q 1/0017 | 219/522 |
| 2016/0109088 A1 * | 4/2016 | Orr | F21S 41/285 | 362/520 |
| 2016/0209022 A1 * | 7/2016 | Cai | G02B 6/04 | |
| 2016/0215952 A1 * | 7/2016 | Dunn | F21S 45/60 | |
| 2016/0363286 A1 * | 12/2016 | Deering | F21S 43/14 | |
| 2017/0175971 A1 * | 6/2017 | Tai | F21S 41/147 | |
| 2017/0234503 A1 * | 8/2017 | Buffone | F21S 41/39 | 362/509 |
| 2017/0240093 A1 * | 8/2017 | O'Sullivan | B60Q 1/0017 | |
| 2017/0327028 A1 * | 11/2017 | Van Straten | F21S 41/153 | |
| 2017/0363266 A1 * | 12/2017 | Feil | F21V 5/008 | |
| 2018/0043862 A1 * | 2/2018 | Lesmeister | F21S 45/60 | |
| 2018/0106448 A1 * | 4/2018 | Shiraishi | B60Q 1/0088 | |
| 2019/0017676 A1 * | 1/2019 | Van Straten | F21S 45/60 | |

* cited by examiner

General technical data

| | | | | |
|---|---|---|---|---|
| Max. operating voltage | | $V_{max}$ | 30 | V DC |
| Rated voltage | | $V_R$ | 12 | V DC |
| Breakdown voltage | | $V_{BD}$ | > 36 | V |
| Curvature | | | < 0.2 | mm |
| Operating temperature range | (V = 0) | $T_{op}$ | −40/+200 | °C |
| Operating temperature range | (V = $V_R$; $T_{a} \leq 60$ °C) | $T_{op}$ | −40/+60 | °C |
| Operating temperature range | (V = $V_R$; $T_{a} > 60$ °C) | $T_{op}$ | −40/+100 | °C |
| Tolerance of $R_{25}$ | (not valid for B59060A0000A010) | $\Delta R_{25}$ | ±30 | % |

ILLUMINATION ASSEMBLY AND EMITTER ASSEMBLY

RELATED PATENT DATA

This patent application claims priority to Ser. No. 15/660,843, which was filed Jul. 26, 2017, entitled, "Heated Vehicle Illumination Assembly, Heated Illumination Assembly, and Heated Emitter Assembly"; which claims priority to U.S. patent application Ser. No. 14/827,176, which was filed Aug. 14, 2015, entitled, "Heated Light Enclosure Having an Adaptable Heating System"; which claims priority to U.S. Provisional Patent Application Ser. No. 62/135,060, which was filed Mar. 18, 2015, entitled "Heated Light Enclosure Having an Adaptable Heating System"; and also claims priority to U.S. Provisional Patent Application Ser. No. 62/037,430, which was filed Aug. 14, 2014, entitled, "Heated Light Enclosure Having an Adaptable Heating System," which are all hereby incorporated by reference.

TECHNICAL FIELD

This disclosure pertains to heated lamps and heated light assemblies for lamps. More particularly, this disclosure relates to apparatus and methods for melting snow and ice and removing condensation from lenses of lights and lighting systems for mobile and stationary applications.

BACKGROUND OF THE INVENTION

Techniques are known for heating lamps and lighting systems. One technique involves providing a heating wire on a back surface of a cover element provided over a vehicle light. However, such a system does not necessarily provide thermal protection for overheating. The recent adoption of LED lighting systems, which generate very little heat, increases the problem of snow and ice accumulating on the lens of such a lighting system. Accordingly, improvements are needed to better enable removal of ice, snow and condensation from lenses of lights and lighting systems.

SUMMARY OF THE INVENTION

Lamps, lights and bulbs are provided with a controlled heating system that provides enough heat to a lens on a lamp assembly to remove snow, frost, and/or condensation without overheating the lens. By heating the lens, accumulation of snow, ice, or vapor is mitigated or eliminated from a surface of the lens, thereby enabling light to transmit through the lens. Applications include lamps and bulbs on conveyance devices, including vehicles, boats, planes, and trains, as well as sedentary structures, such as lamp posts, street lights, railroad crossing markers and lights, and airport ground and runway lighting systems.

According to one aspect, a vehicle heated light assembly is provided including an enclosure, a light emitting diode lamp, a positive temperature coefficient heater, a thermal heat sink, power circuitry, and a power supply connection. The enclosure is provided by a housing and a lens. The light emitting diode lamp is provided in the enclosure configured to emit light through the lens. The positive temperature coefficient heater is provided within the enclosure. The thermal heat sink is provided in the enclosure and is physically affixed in thermally conductive relation with the positive temperature coefficient heater. The power circuitry has a source voltage coupled with the positive temperature coefficient heater and voltage regulating circuitry coupled with the source voltage and configured to provide a reduced voltage to the light emitting diode lamp. The power supply connection is coupled with the power circuitry to provide the source voltage.

According to another aspect, a vehicle heated light assembly is provided including an enclosure, a light emitting diode lamp, a positive temperature coefficient heater, a thermal heat sink, power circuitry, a power supply connection, and at least one elongate and thermally conductive heat pipe. The enclosure is provided by a housing and a lens. The light emitting diode lamp is provided in the enclosure and is configured to emit light through the lens. The positive temperature coefficient heater is provided within the enclosure. The thermal heat sink is provided in the enclosure and is physically affixed in thermally conductive relation with the positive temperature coefficient heater. The power circuitry has voltage regulating circuitry, a first pair of nodes providing a first voltage to the positive temperature coefficient heater, and a second pair of nodes providing at a second, reduced voltage. The voltage regulating circuitry is configured to provide a reduced voltage source to the light emitting diode lamp. The power supply connection is coupled to the power circuitry to provide the first voltage to the power circuitry. At least one elongate and thermally conductive heat pipe is affixed in thermally conductive relation with the heat sink proximate the lens.

BRIEF DESCRIPTION OF THE DRAWINGS

Preferred embodiments of the disclosure are described below with reference to the following accompanying drawings.

FIGS. 25-29, 31 and 34 are partially disassembled perspective views of another unique heating source, shown in FIGS. 13-18, using a PTC heater, a heat sink, and L-shaped heat pipes.

FIGS. 30, 32, 34 and 45 are partially disassembled perspective views of another unique heating source using a centrally mounted PTC heater and a pair of I-shaped heat pipes.

DETAILED DESCRIPTION OF THE
PREFERRED EMBODIMENTS

This disclosure is submitted in furtherance of the constitutional purposes of the U.S. Patent Laws "to promote the progress of science and useful arts" (Article 1, Section 8).

LED (light emitting diodes) light enclosures for on-road or off-road use are non-heated lights. A series of temperature controlled heated light assemblies are shown below in FIGS. 1-2 and 5-9. These lights are independently controlled environments to ensure a constant temperature on the surface of the lens. Guaranteeing no ice or fog build up on the inside or outside of the lens allows for clarity even in the coldest climates. An adaptable heating system is used to perform this task. PTC (Positive Temperature Coefficient) heating elements provide a mechanism where the heater is self-regulating, eliminating the need for a thermostat. The heating element filament will increase or decrease the resistive property (increasing the resistance decreases the heat and decreasing the resistance increases the heat) depending on the surrounding temperature. This gives the heating element a more efficient power consumption than for regular, or prior design heating elements. The prior design heating elements just turn on to the maximum heat until a thermostat turns it off. The PTC heater is placed at the bottom of the enclosure, allowing for natural convection to occur (hot air rises and cold air will cycle down), and ensuring even heat transfer to the lens. The element is tied right into the existing light circuitry, making installation of a heated light as simple as unplugging one and plugging the other in its place.

Figure 1:
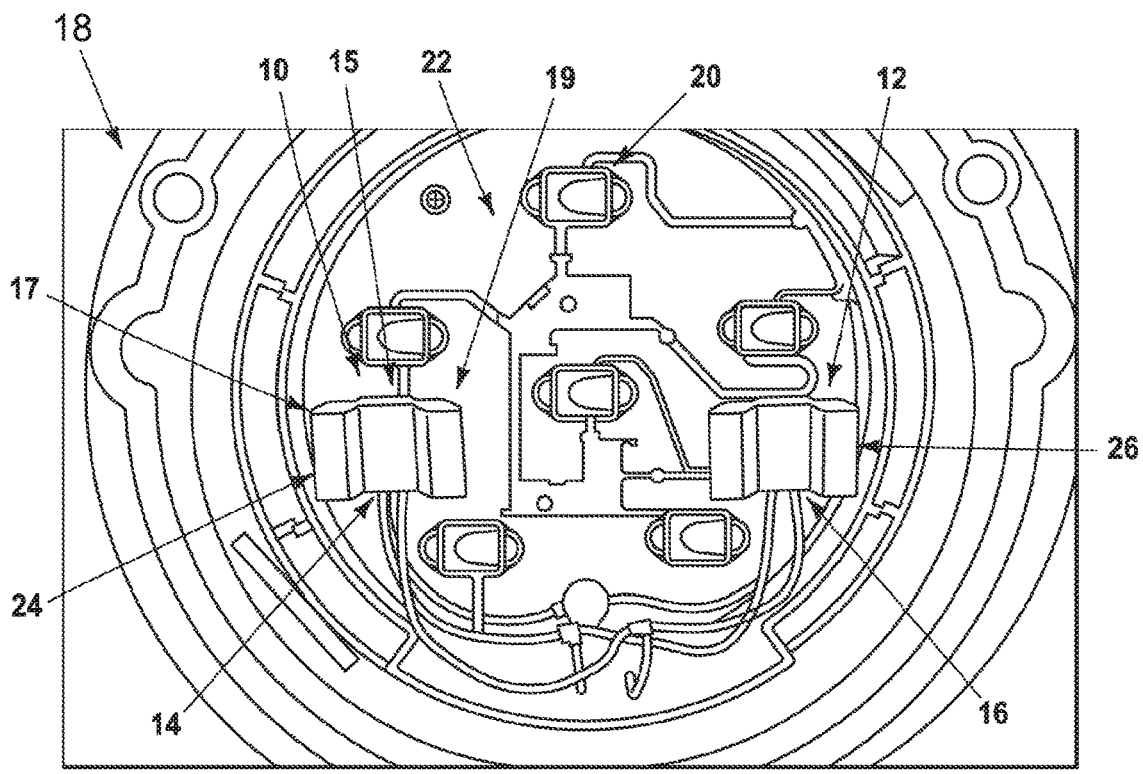
FIG. 1 is a plan view of a tail light assembly with the lens removed showing a pair of PTC heaters with self-regulating temperature features according to one aspect.
Figures 2, 3:
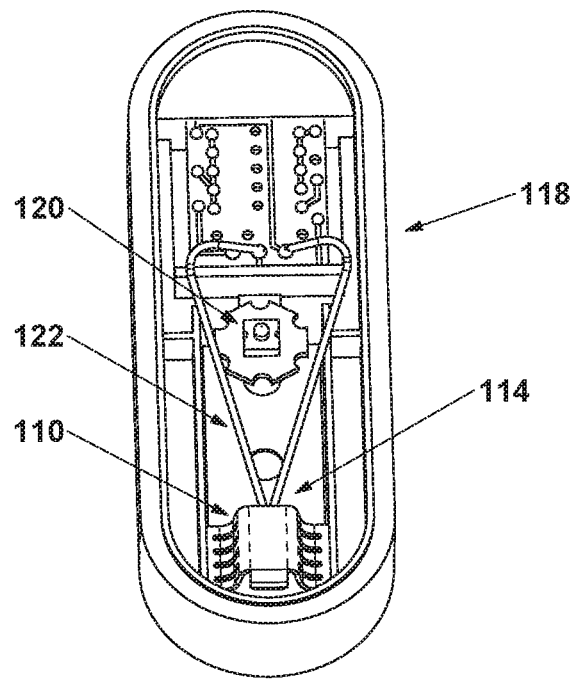
FIG. 2 is a perspective view from above with a cylindrical lens cover removed of a heated vehicle tail light assembly with a PTC heater according to another aspect.
FIG. 3 is a Table showing general technical data for the custom PTC heater of FIGS. 1 and 2.
Figure 4:
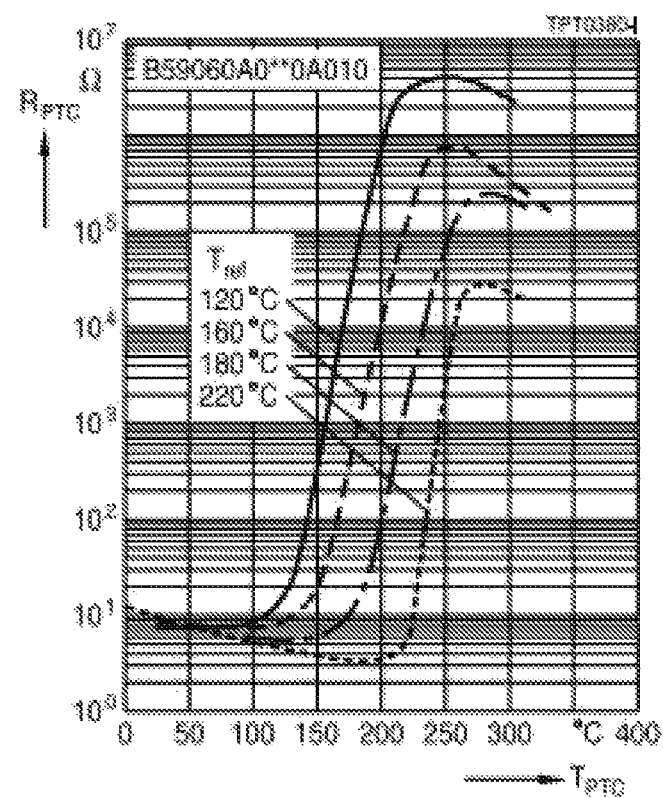
FIG. 4 is a Plot of a power curve for the PTC heater of FIGS. 1-3.

FIG. 1 illustrates one construction for a heating source 10 and 12 that uses a custom PTC (positive temperature coefficient) heater unit 14 and 16, respectively, designed to keep the ambient temperature within a vehicle light 18 (such as a head light, tail light or marker light) at 140 Degrees F. This pair of heat sources 10 and 12 allows for the heat transfer to the lens to be hot enough to keep snow and ice build up from occurring. Key features of our heating implementation are the simplicity of having a heater and thermostat all in one unit, and also the power tie in before the voltage regulator circuit in the existing light hardware (i.e., a vehicle 12 Vdc source). A new feature is the upgraded heat sink 24 and 26 used with the PTC element 14 and 16, which allows for maximum radiant heat to be achieved. When constructing these units, each heat sink 24 and 26 is pried open along a medial section and a respective PTC element 14 and 16 is inserted therein, after which the medial segment of the heat sink is physically compressed onto the respective PTC element 14 and 16, and silver solder is applied therebetween to affix the element and provide a heat transfer pathway that will also withstand the rapid heat change and also provide for a good connection. A high heat UV cured adhesive can also be used to keep and retain components secure from vibration and act as a heat barrier to protect the existing circuitry, as shown in FIGS. 6-9. FIG. 3 provides data for the custom PTC heater (of FIGS. 1 and 2) and FIG. 4 provides a power curve.

The present custom designed PTC heater is made to turn on when temperatures are below 32 Degrees Fahrenheit and to keep the ambient temperature at 140 Degrees Fahrenheit. The unique power tie for the heating system is directly wired to the leads before (or upstream of) the power regulating circuit. This eliminates the need for additional leads or power ties to be added in the existing system. Other temperature change thresholds (and ranges) can also be realized by selecting a PTC heater having different operating characteristics.

One exemplary PTC heater for elements 14 and 16 is available for purchase from Mouser Electronics, 1000 North Main Street Mansfield, Tex. 76063 USA, using a PTC thermistors as a heating element. A metallized round disk PTC thermistor can be used by EPCOS/TDK, 12 Vdc, 3 ohms disc PTC heating, Series/Type: B59060, Mouser Part No. 871-B59060A0160A010, EPCOS/TDK Manufacturer Part No. B59060A0160A010. Alternatively, PTC heaters can have rectangular or square configurations.

One exemplary thermal heat sink for elements 24 and 26 is available for purchase from Digikey Electronics, 701 Brooks Avenue South, Thief River Falls, Minn. 56701 USA, as an Aavid Thermalloy 577500B00000G, Digikey Part No. HS216-ND, Aavid Thermalloy Part No. 577500B00000G, HEATSINK TO-126 VERT MNT SLIP-ON. Such heat sinks 24 and 26 are formed from aluminum, a material that has desirable thermal conductivity characteristics for dissipating heat within a lighting enclosure. Such heat sink has a thermal resistance of 26 c/W with a cross-sectional tubular width of 19.81 mm, tubular axial depth of 13.21 mm., and a cross-sectional height of 8.13 mm.

Figure 1A:
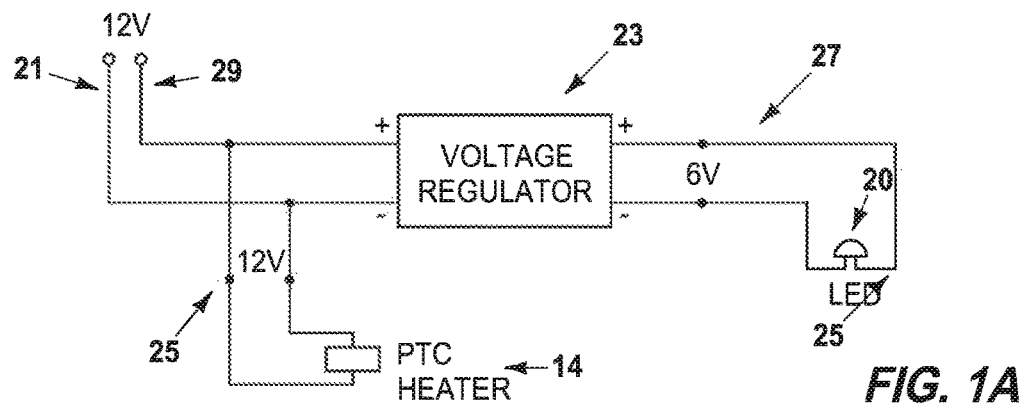
FIG. 1A is a simplified circuit diagram for one suitable power circuitry for powering a vehicle heated light assembly, as shown in FIG. 1.

FIG. 1A illustrates a simplified circuit diagram for one suitable power circuitry for powering a vehicle heated light assembly, as shown in FIG. 1. More particularly, power circuitry includes a source of power and power supply connection, such as a 12 Vdc vehicle battery and/or alternator associated with a vehicle wiring harness. Conductive wiring 29 on the vehicle wiring harness includes a pair of conductive leads, or wires 25 at a pair of nodes that provides 12 Vdc power directly to one or more PTC heaters 14 within a vehicle light assembly. A voltage regulator 23 provides a reduced voltage through a pair of conductive leads, or wires at a second pair of nodes 27 to one or more light emitting diode (LED) lamps 20 within the vehicle light assembly.

Figure 1B:
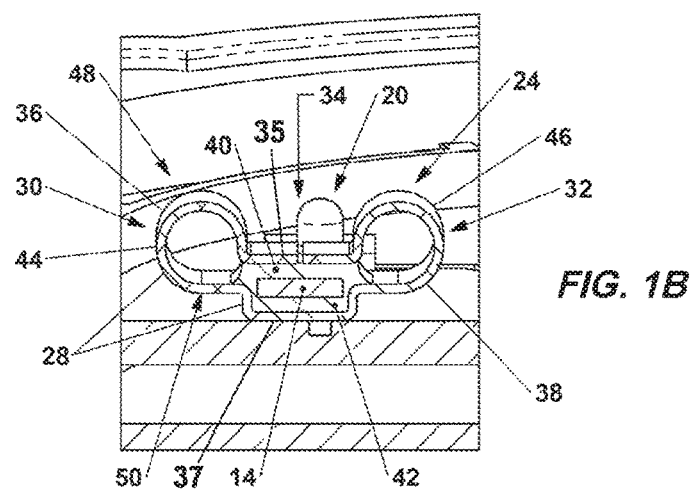
FIG. 1B is a vertical sectional view taken along line 1B-1B of FIG. 1.

FIG. 1B shows heat unit 14 in cross section adjacent an LED 20. Heat sink 24 is formed from a tubular cross-sections portion 28 with a pair of opposed, symmetric and isomerous wings 30 and 32 extending from a central, medial section 34 of opposed planar top and bottom surfaces 35 and 37 of a reduced dimension tubular portion defined between surfaces 35 and 37 that provides a centrally thermally conductive contact portion. Wings, or wing portions 30 and 32 each form an enlarged tubular outer end portion 36 and 38, respectively, relative to medial section 34. Heater unit 14 is inserted inside of medial section 34 where it is affixed with layers 40 and 42 of solder or thermally conductive glue. Wings 30 and 32 each form a peripheral edge 44 and 46, respectively. Furthermore, wings 30 and 32 form a top heat dissipating surface 48 and a bottom heat dissipating surface 50, respectively.

A rectangular PTC heater 114 is similarly affixed onto a heat sink 110 that is further affixed onto a base plate 122 within an oblong, vehicle tail light assembly 118, as shown in FIG. 2. An LED lamp 120 is also mounted atop base plate 122.

FIG. 3 depicts a Table showing general technical data for the custom FTC heater of FIGS. 1 and 2.

FIG. 4 is a plot of a power curve for the PTC heater of FIGS. 1-3.

Figure 5:
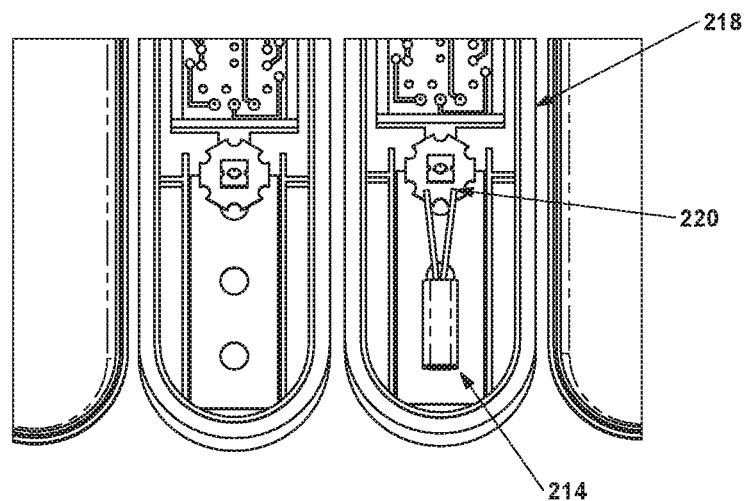
FIG. 5 is a perspective view from above for an earlier version of the heated vehicle tail light assembly of FIG. 2 with lens removed.

FIG. 5 is a perspective view from above for an earlier version of the heated vehicle tail light assembly 218 shown in FIG. 2 with lens removed. A polyimide heater 214 is adhesively affixed to a support structure within tail light assembly 218, adjacent an LED lamp 220.

Figure 6:
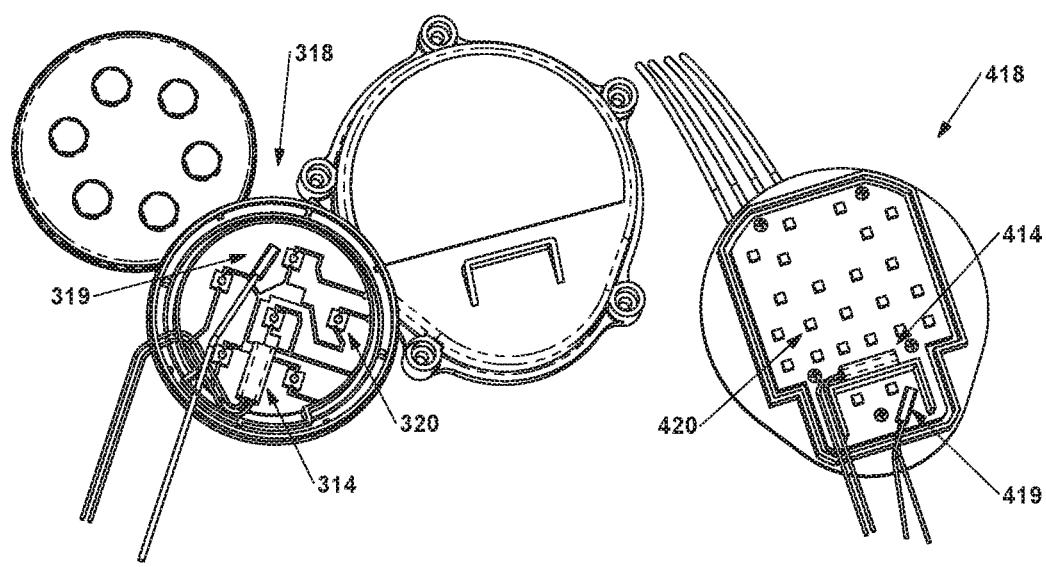
FIG. 6 is a perspective view from above in disassembly of two earlier versions of the heated vehicle tail light assembly of FIG. 1.

FIG. 6 is a perspective view from above in disassembly of two earlier versions of the heated vehicle tail light assembly, namely tail light assemblies 318 and 418 which are similar to the tail light assembly of FIG. 1. A polyimide heater 314 is provided with a thermistor 319 embedded in an array of LED lamps 320, which provides an on/off function controlled by a preset temperature range with the heater 314. A polyimide heater provides radiant heat and the attached thermistor is wired together to regulate temperature and maximize efficiency. Similarly, light 418 includes a polyimide heater 414 and a thermistor 419 embedded in an array of LED lamps 420.

Figure 7:
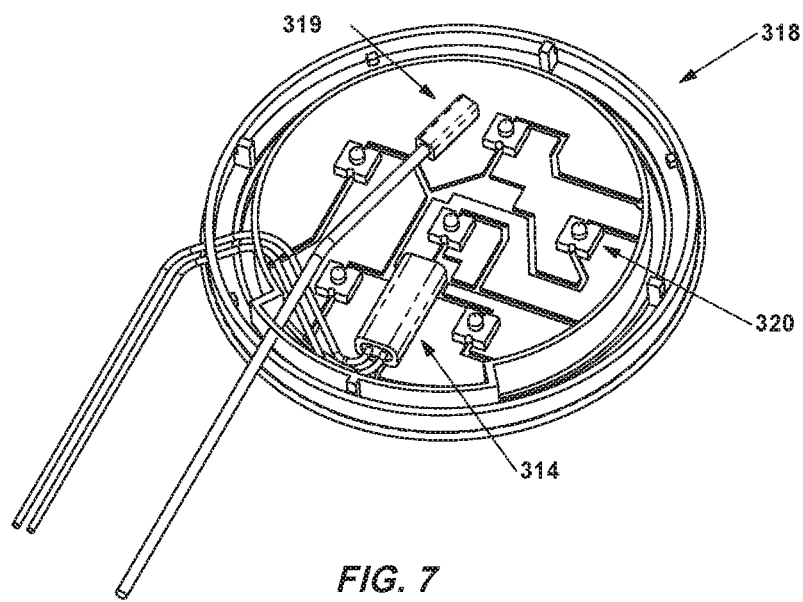
FIG. 7 is a close up of the PTC heater placement on a first of the heated vehicle tail light assemblies of FIG. 6.

FIG. 7 is a close up view showing placement of the polyimide heater 314 with adhesive on a first of the heated vehicle tail light assemblies 318 of FIG. 6, including thermistor 319 provided adjacent an LED lamp 320.

Figure 8:
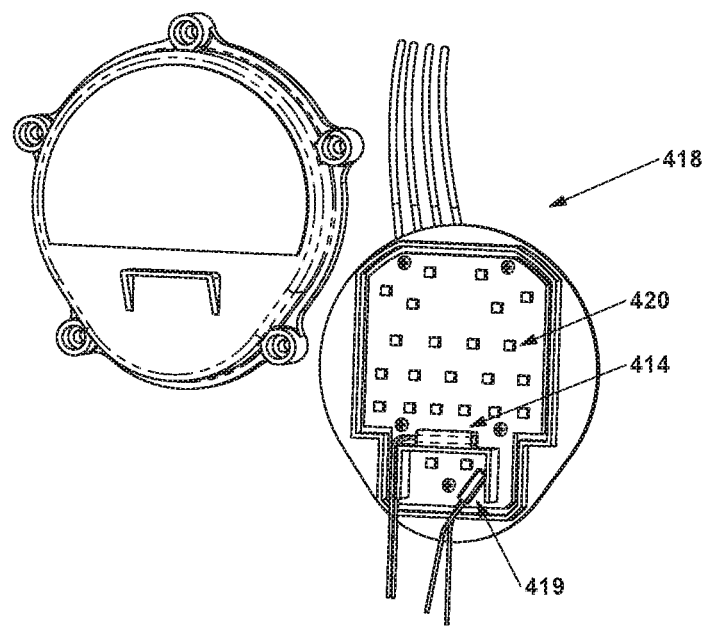
FIG. 8 is a close up of the FTC heater placement on a second of the heated vehicle tail light assemblies of FIG. 6.

FIG. 8 is a close up view showing placement of the polyimide heater 414 on a second of the heated vehicle tail light assemblies 418 of FIG. 6, including thermistor 420 provided adjacent an array of LED lamps 420.

Figure 9:
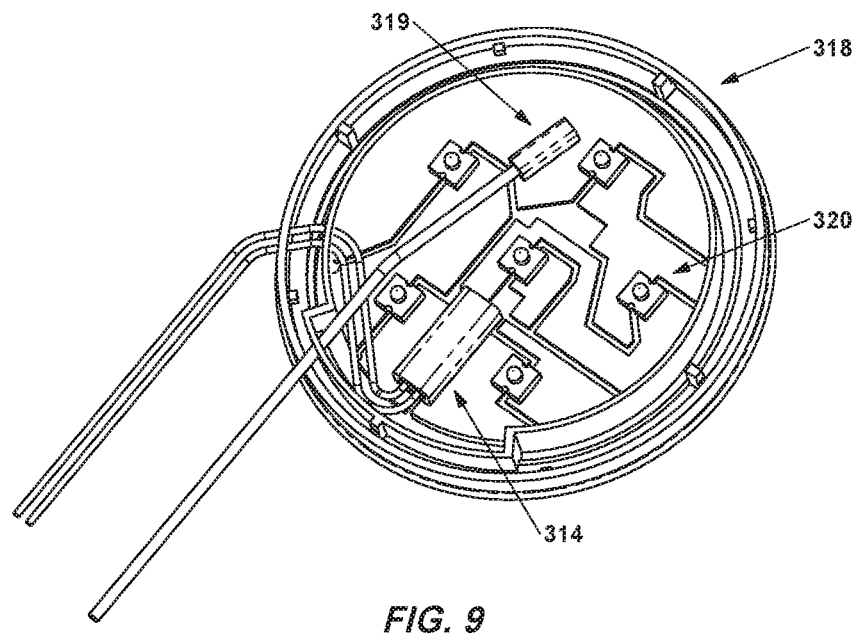
FIG. 9 is another close up of the PTC heater placement of FIG. 7.

FIG. 9 is another close up view showing placement of the polyimide heater 314 and thermistor 319 relative to LED 320 within light 318 of FIG. 7.

Figure 10:
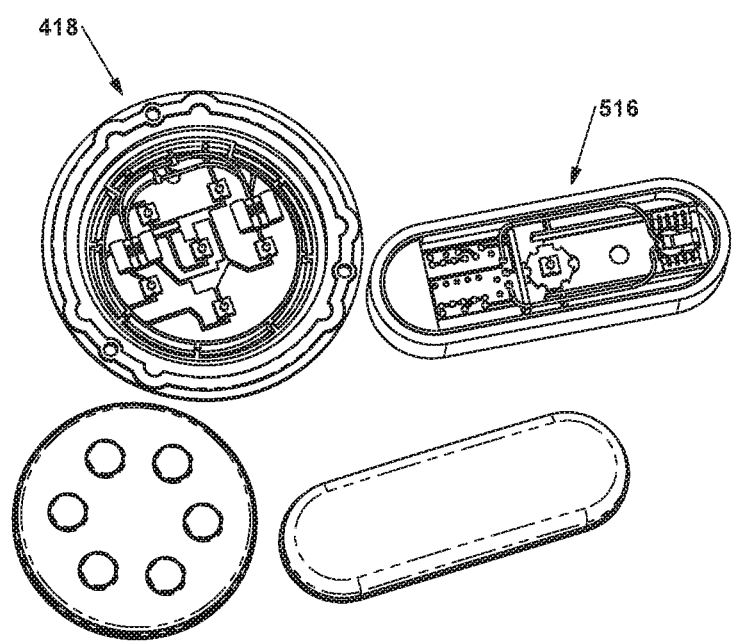
FIG. 10 is a perspective view from above in disassembly of modified two earlier versions of the heated vehicle tail light assembly of FIG. 1 using a heat sink with a PTC heater to provide a heating source.

FIG. 10 is a perspective view from above in disassembly of two unique heated vehicle tail light assemblies 418 and 518 similar to those depicted in FIG. 1 using a heat sink with a PTC heater to provide a heating source.

Figure 11:
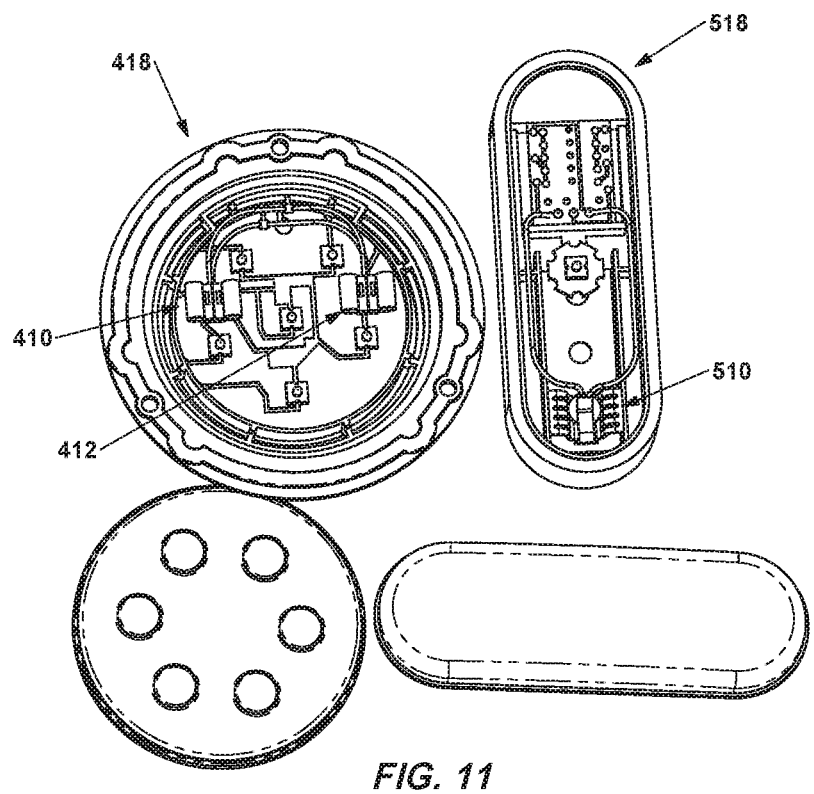
FIG. 11 is another perspective view of the heated tail light assemblies of FIG. 10.

FIG. 11 is another perspective view of the heated tail light assemblies of FIG. 10. More particularly, heated tail light 418 includes two heat sources 410 and 412, each including a heat sink and a PTC heater. Likewise, heated tail light 518 has a heat source 510 including a heat sink and a PTC heater.

Figure 12:
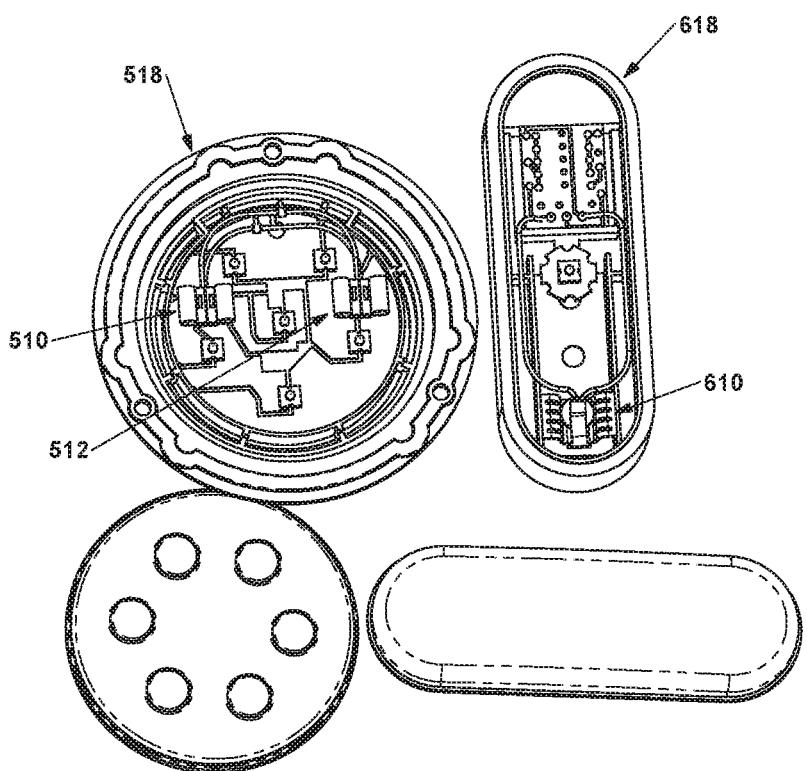
FIG. 12 is yet another perspective view of the heated tail light assemblies of FIGS. 10 and 11.
Figure 13:
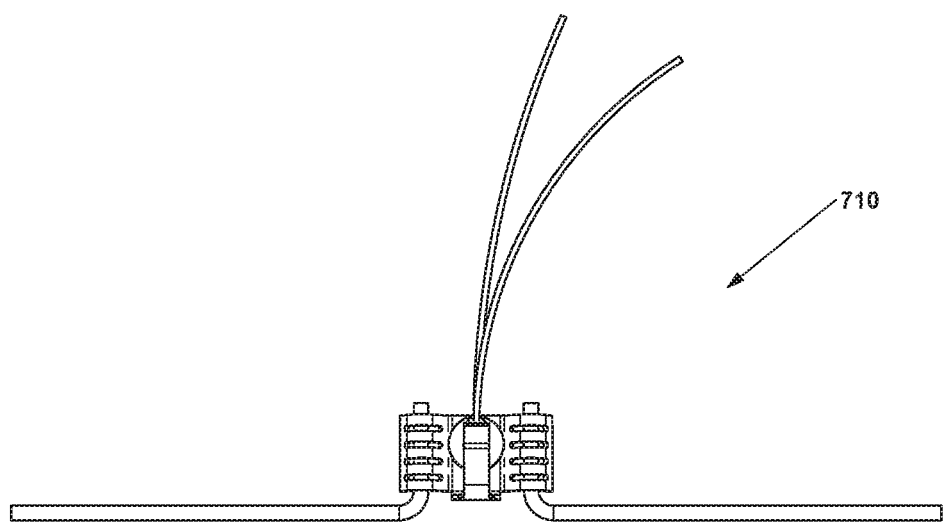
FIGS. 13-18 each are perspective views from above of a heating source using a PTC heater with a heat sink and a pair of elongate, thermally conductive L-shaped heat pipes.
Figure 14:
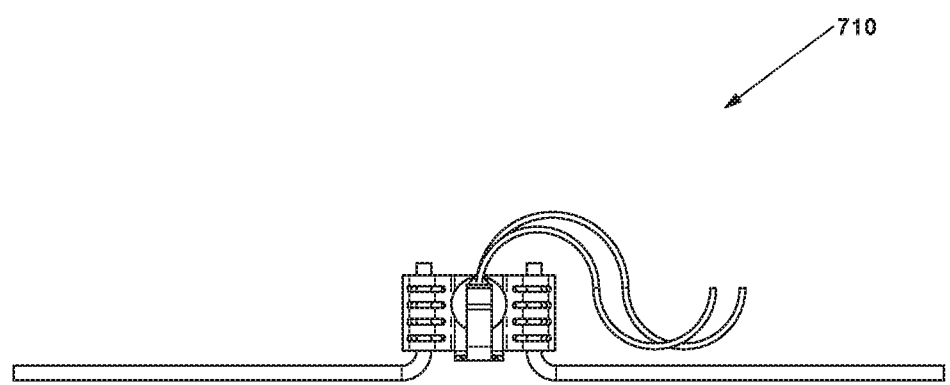
Figure 15:
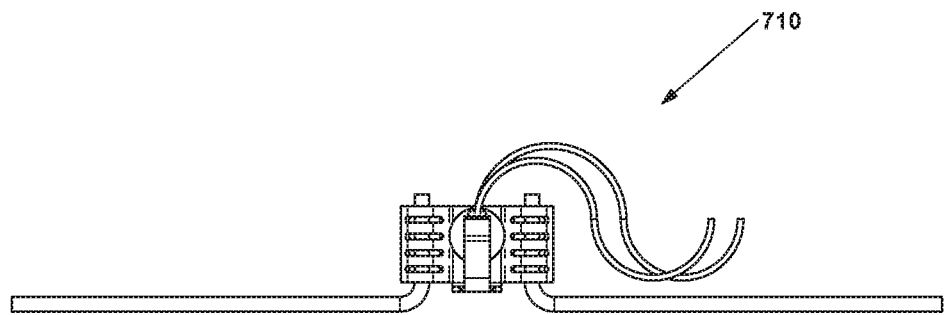
Figure 16:
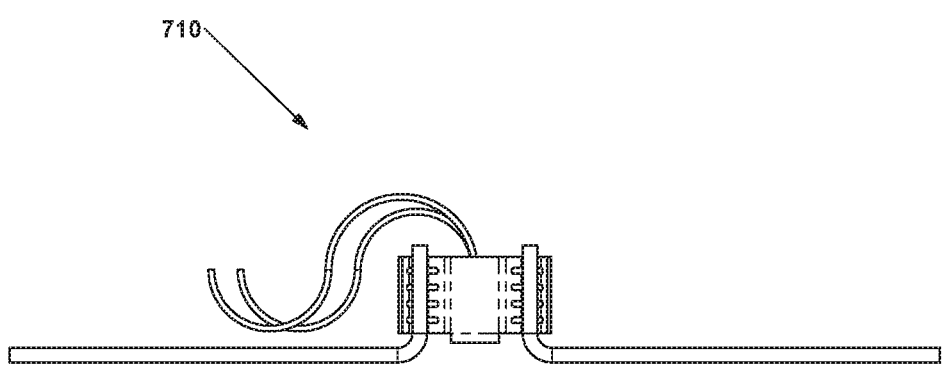
Figure 17:
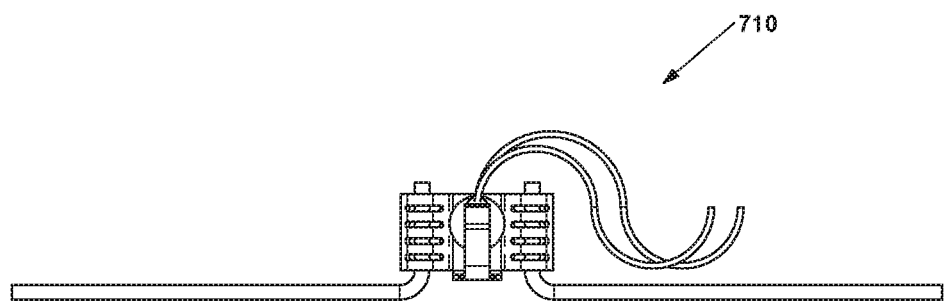
Figure 18:
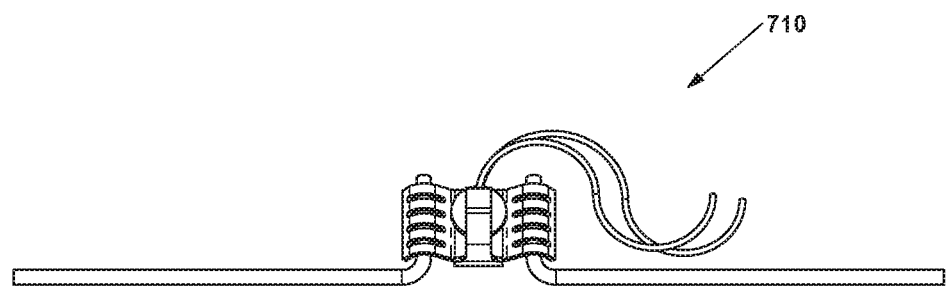

FIG. 12 is yet another perspective view of the heated tail light assemblies of FIGS. 10 and 11. More particularly, heated tail light 518 includes two heat sources 510 and 512, each including a heat sink and a PTC heater. Likewise, heated tail light 618 has a heat source 610 including a heat sink and a PTC heater.

FIGS. 13-18 each are perspective views from above of a heating source 710 using a PTC heater with a heat sink and a pair of elongate, thermally conductive L-shaped heat pipes. The PTC heater comprises a rectangular PTC heater wired to deliver current delivered across the PTC heater with insulated wire leads that are conductively soldered to each side of the heater. Conductive insulated wire leads are affixed to opposite sides of the PTC heater, and current is applied across the PTC heater, in operation. The PTC heater is either soldered onto the heat sink, or physically seated on the heat sink, after which silver solder is applied along edges to secure the PTC heater in thermally conductive relation with the heat sink. Each heat pipe is formed from a hollow copper tube. Each heat sink includes a pair of cylindrical edge apertures and slits are cut into each aperture. A leg on each L-shaped heat pipe is inserted into one of the apertures, after which adhesive or epoxy is applied in each slit, thereby securing an end of each heat pipe in thermally conductive relation within the heat sink. Likewise, individual heat sinks are adhesively (or soldered) in thermally conductive relation onto ends of the heat pipes FIGS. 19-21 each are perspective views from above of an alternate geometric configuration heating source 810 using a pair of FTC heaters with a pair of heat sinks and a pair of elongate, thermally conductive I-shaped heat pipes each additionally having a heat sink adhesively and/or physically affixed at each end with a double-backed adhesive mounting strip. The PTC heaters are wired in parallel, with current delivered across each PTC heater by insulated wire leads. Each heat pipe is formed from a hollow copper tube. Other thermally conductive materials can be used for the heat pipes, such as aluminum or any other suitable thermally conductive structural material. Individual PTC heaters are silver soldered (or adhesively affixed) onto both heat pipes. Likewise, individual heat sinks are adhesively affixed (or soldered) in thermally conductive relation onto ends of the heat pipes. Segments of adhesively doubled sided foam trim tape are affixed to each heat sink to facilitate fixation (along with fasteners) to a component on a vehicle light assembly. Optionally, fasteners can be used.

Figure 22:
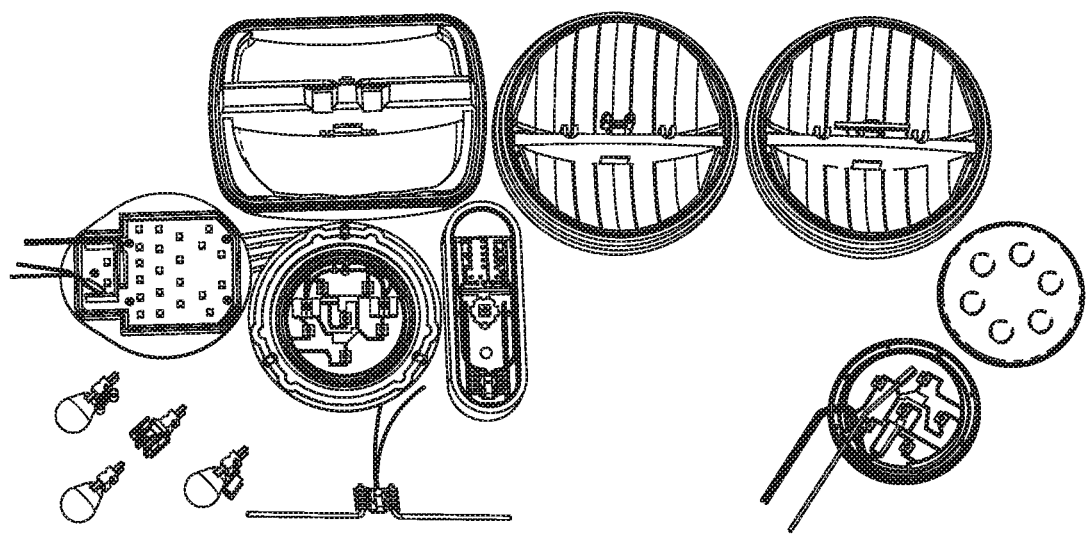
FIG. 22 is a perspective view of eight unique heating sources for vehicle lights.
Figure 23:
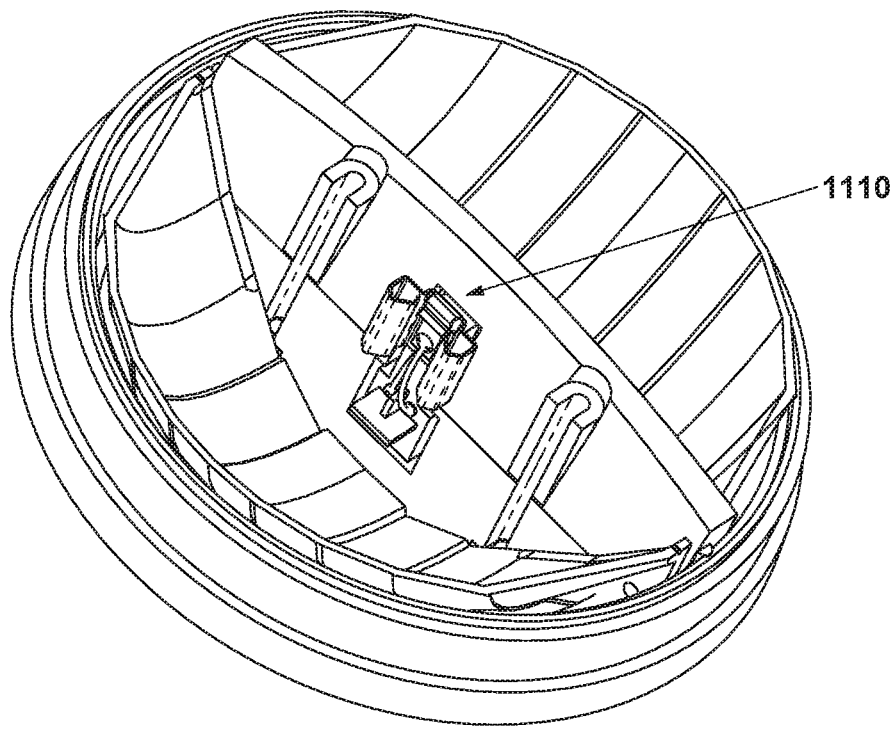
FIGS. 23-24, 33-34 are partially disassembled perspective views of a unique heating source using a PTC heater and a heat sink mounted within a vehicle headlight.
Figure 24:
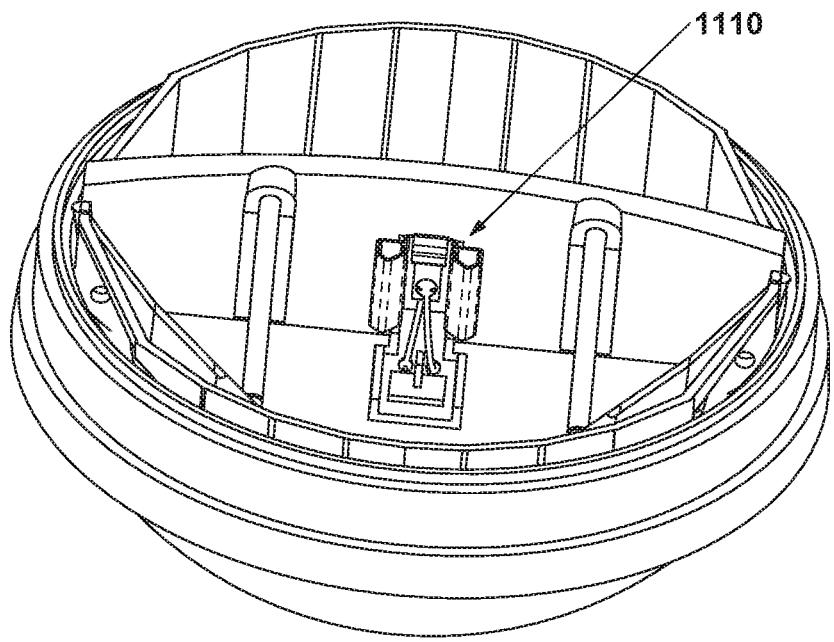
Figure 25:
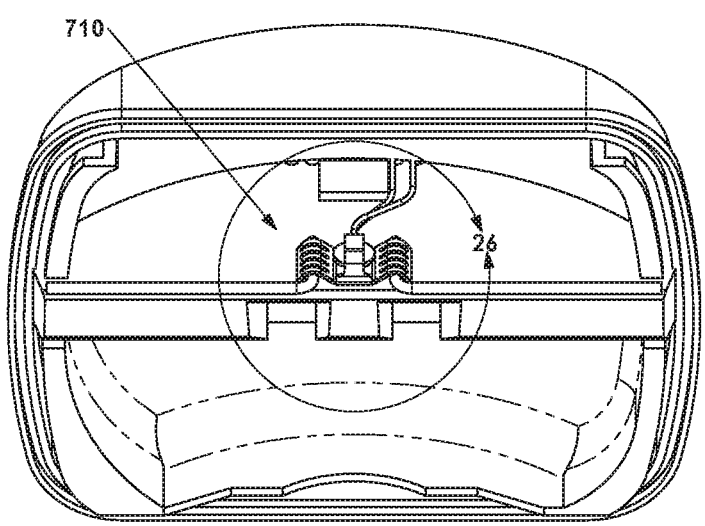
Figure 26:
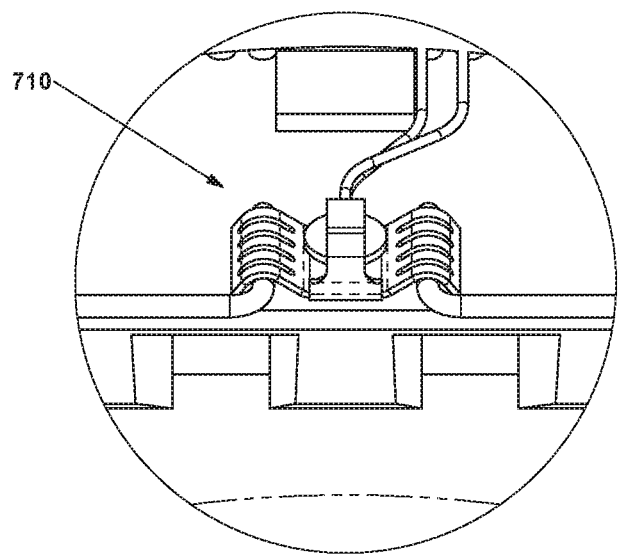
Figure 27:
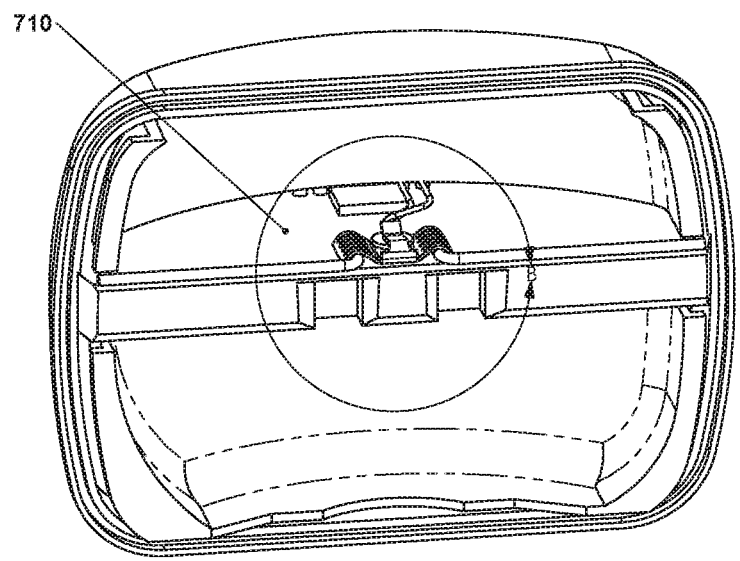
Figure 28:
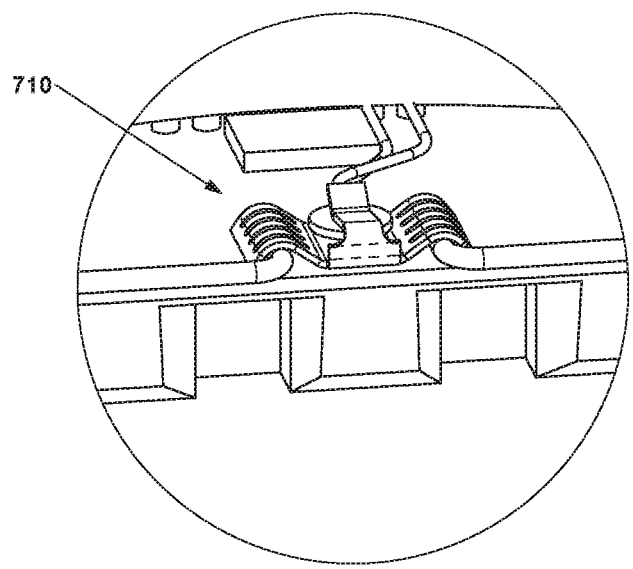
Figure 29:
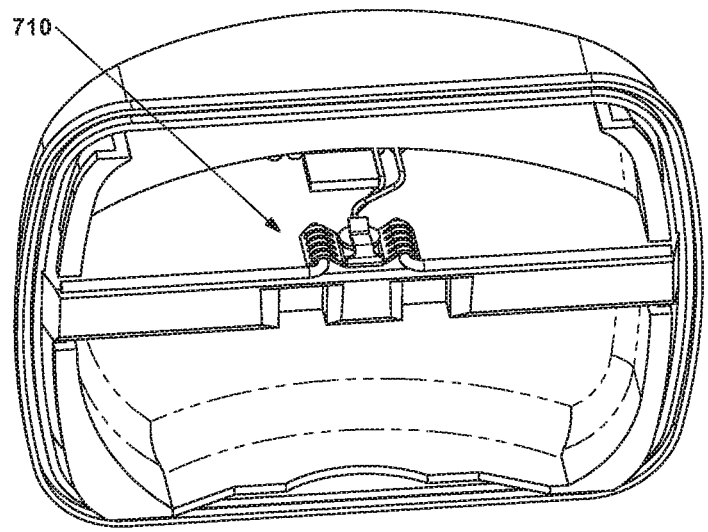
Figure 30:
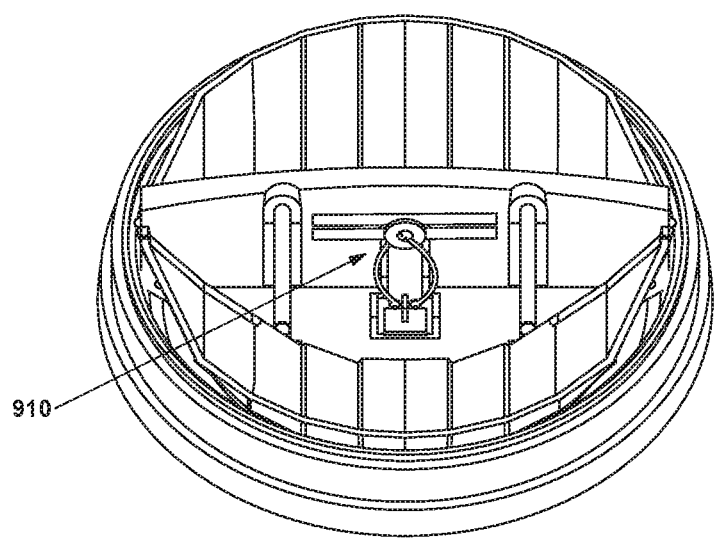
Figure 31:
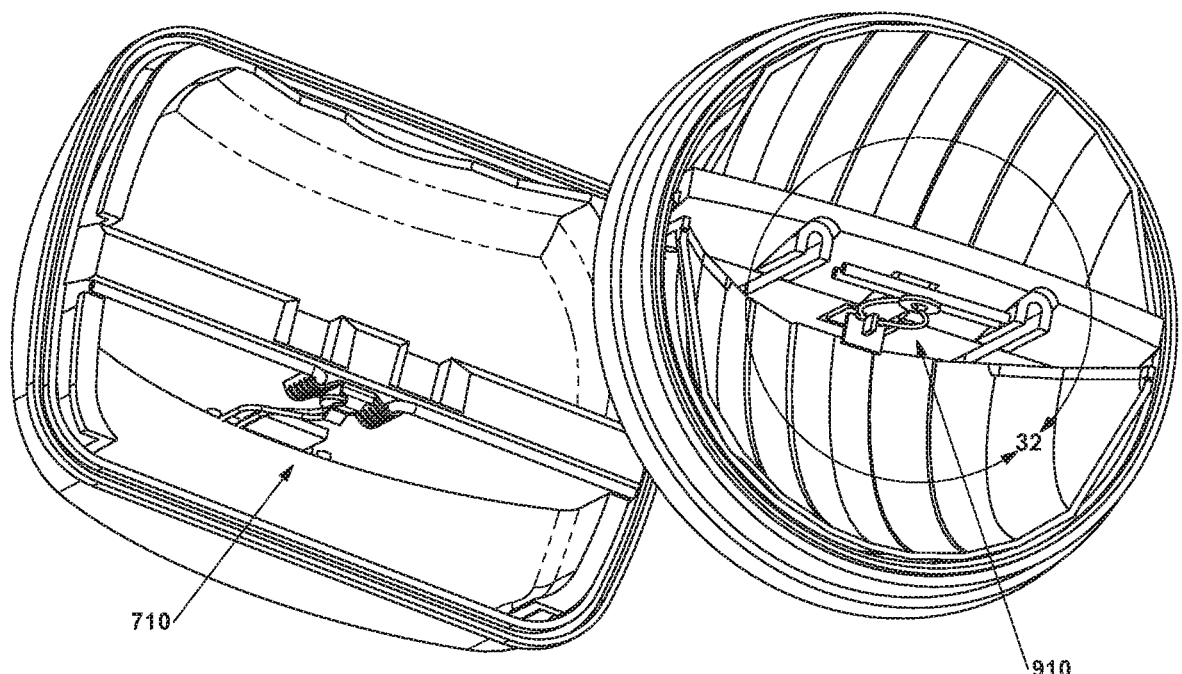
Figure 32:
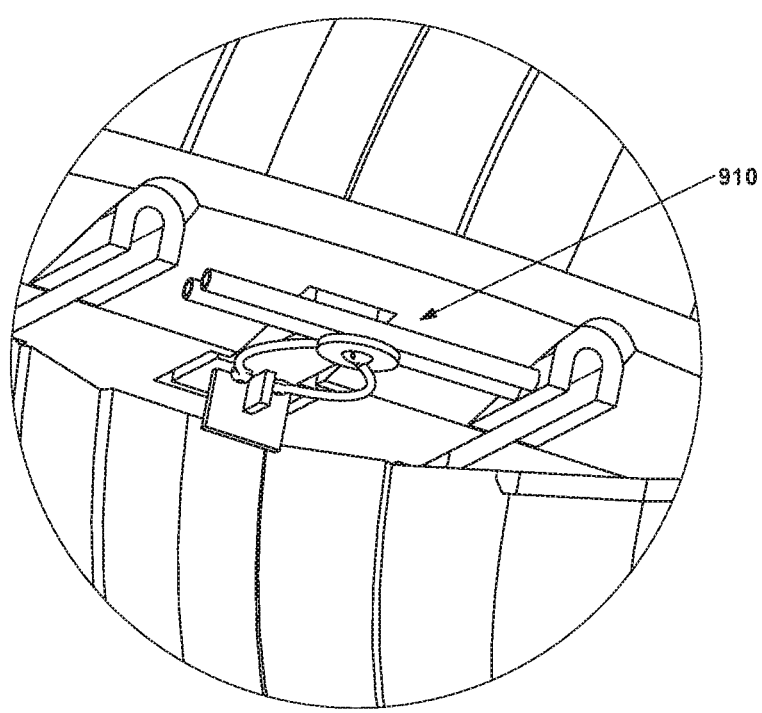
Figure 33:
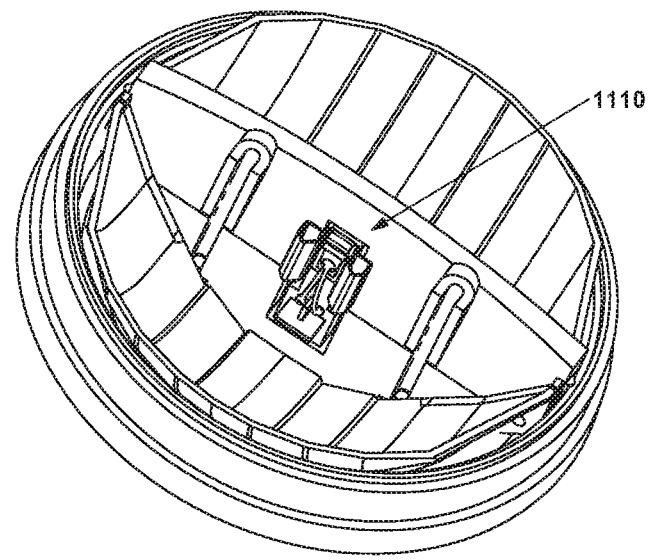

FIG. 22 is a perspective view of eight unique heating sources for vehicle lights.

FIGS. 23-24, 33-34 are partially disassembled perspective views of a unique heating source 1110 using a PTC heater and a heat sink mounted within a vehicle headlight. The PTC heater includes a heat sink comprising an Aavid Thermalloy Part No. 577500B00000G, HEATSINK TO-126 VERT MNT SLIP-ON, available from Digikey Electronics, 701 Brooks Avenue South, Thief River Falls, Minn. 56701 USA, Digikey Part No. HS216-ND. A rectangular PTC heater is soldered or adhesively affixed in thermally conductive relation atop the heat sink which is further retained or affixed to a component of the vehicle light housing.

FIGS. 25-29, 31 and 34 are partially disassembled perspective views of another unique heating source 710, shown in FIGS. 13-18, using a PTC heater, a heat sink, and L-shaped heat pipes.

Figure 34:
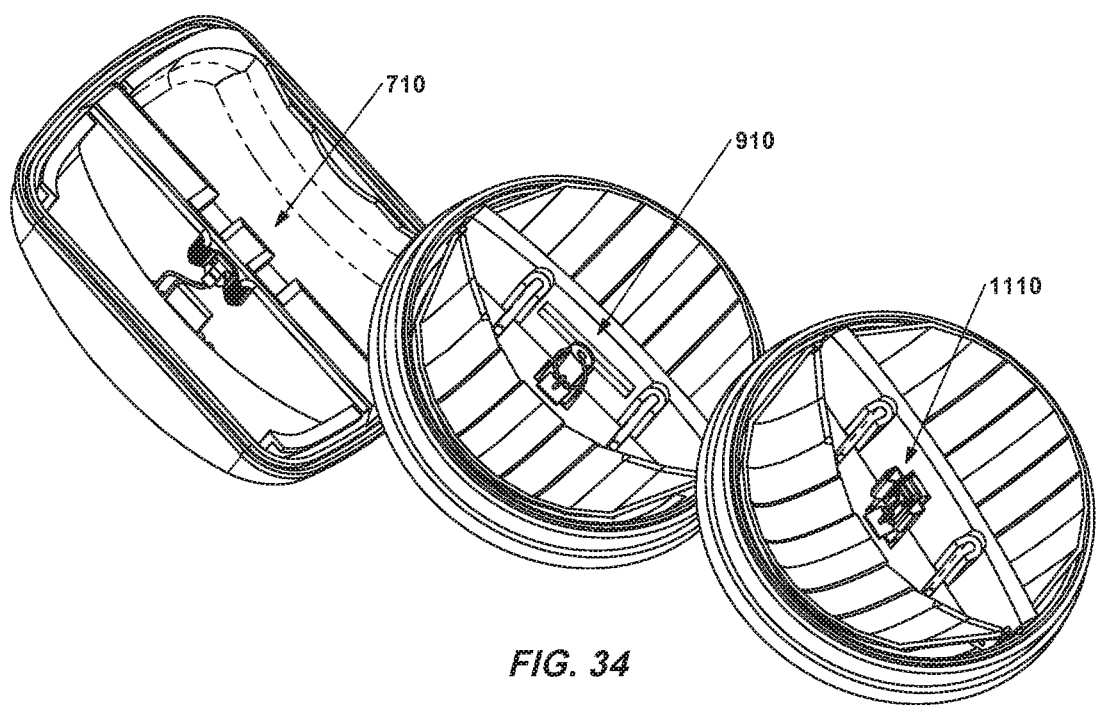
Figure 35:
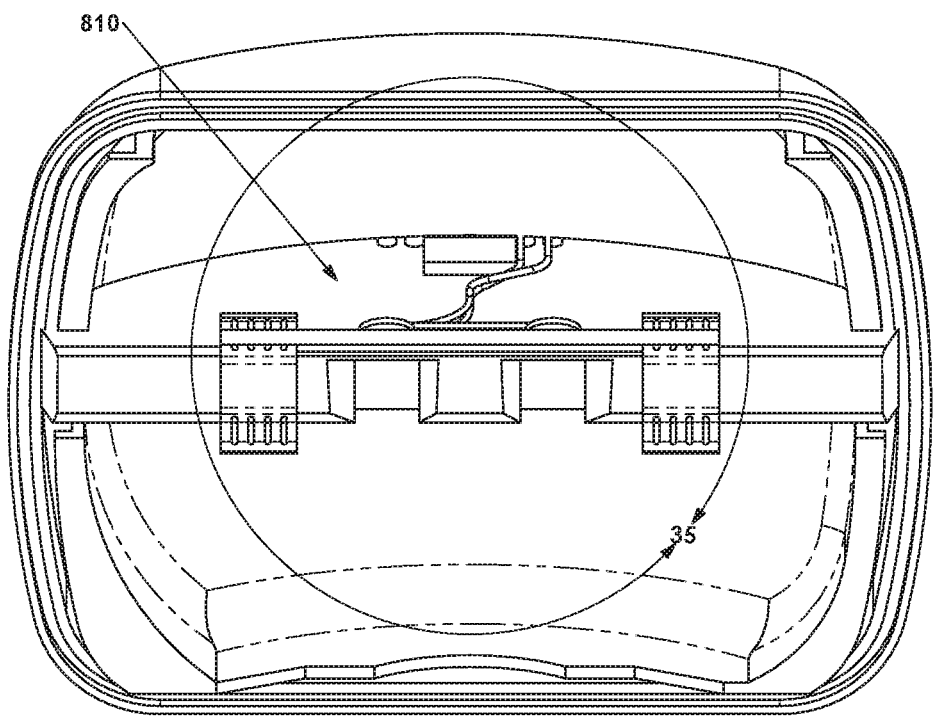
FIGS. 35-44 are partially disassembled perspective views of yet another unique heating source, shown in FIGS. 19-21, using a pair of PTC heaters affixed in spaced-apart relation along a medial portion of a pair of I-shaped heat pipes, with a heat sink affixed at each end of the pair of heat pipes.
Figure 36:
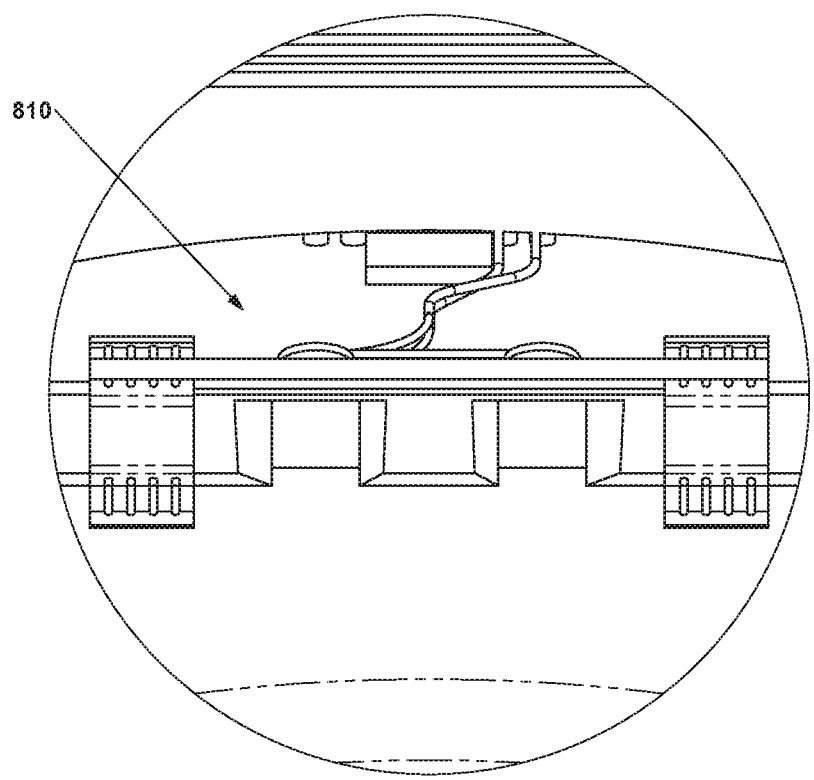
Figure 37:
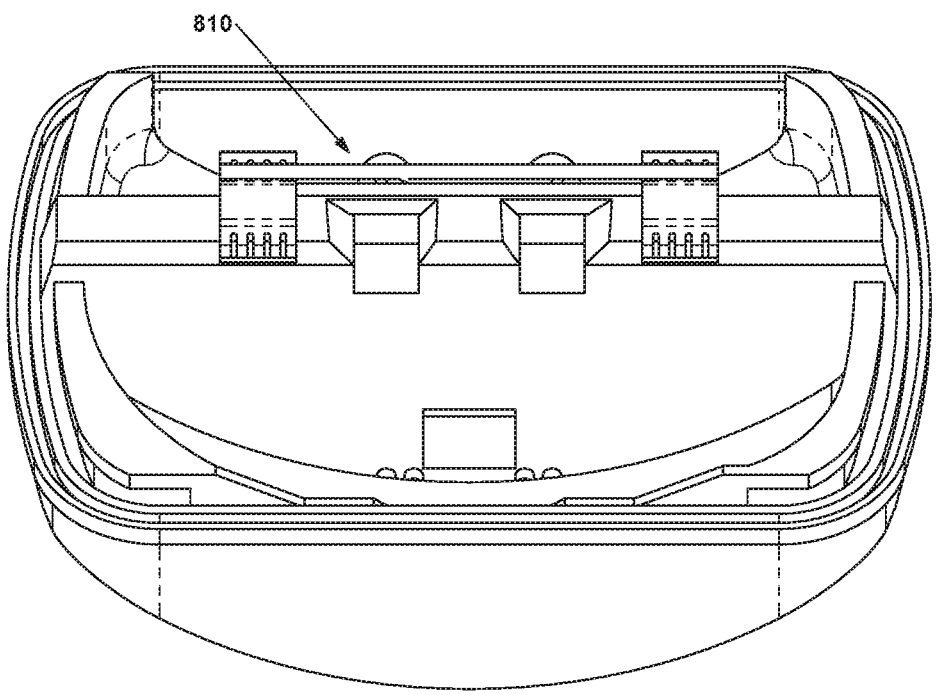
Figure 38:
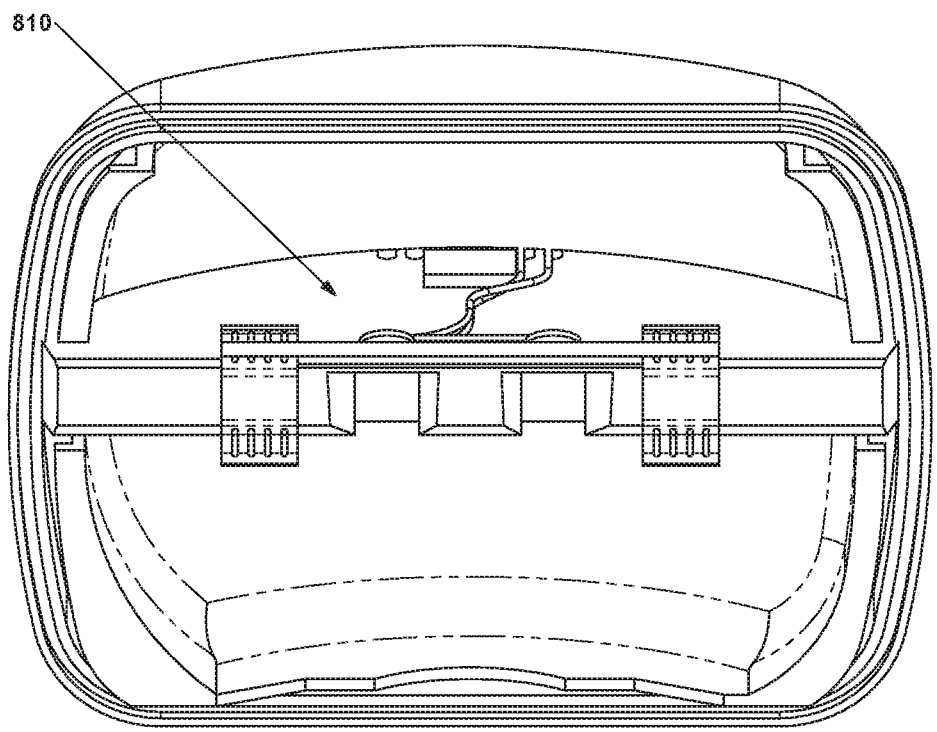
Figure 39:
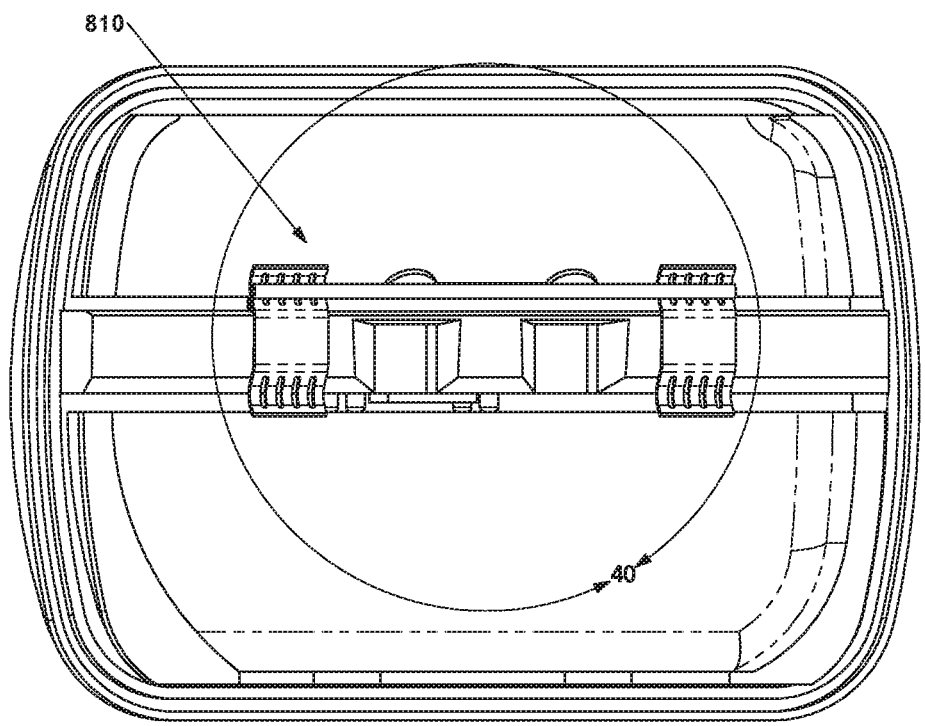
Figure 40:
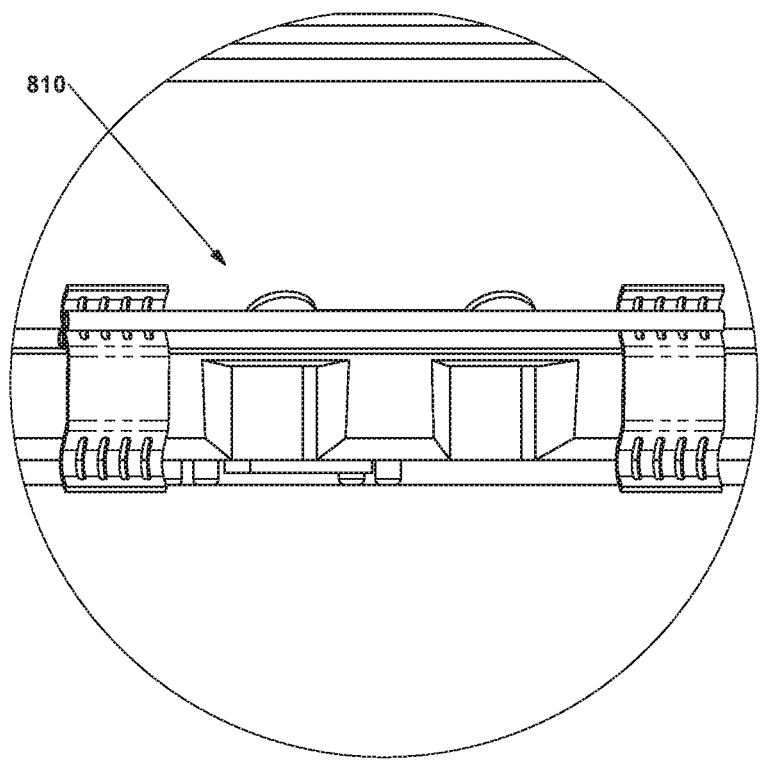
Figure 41:
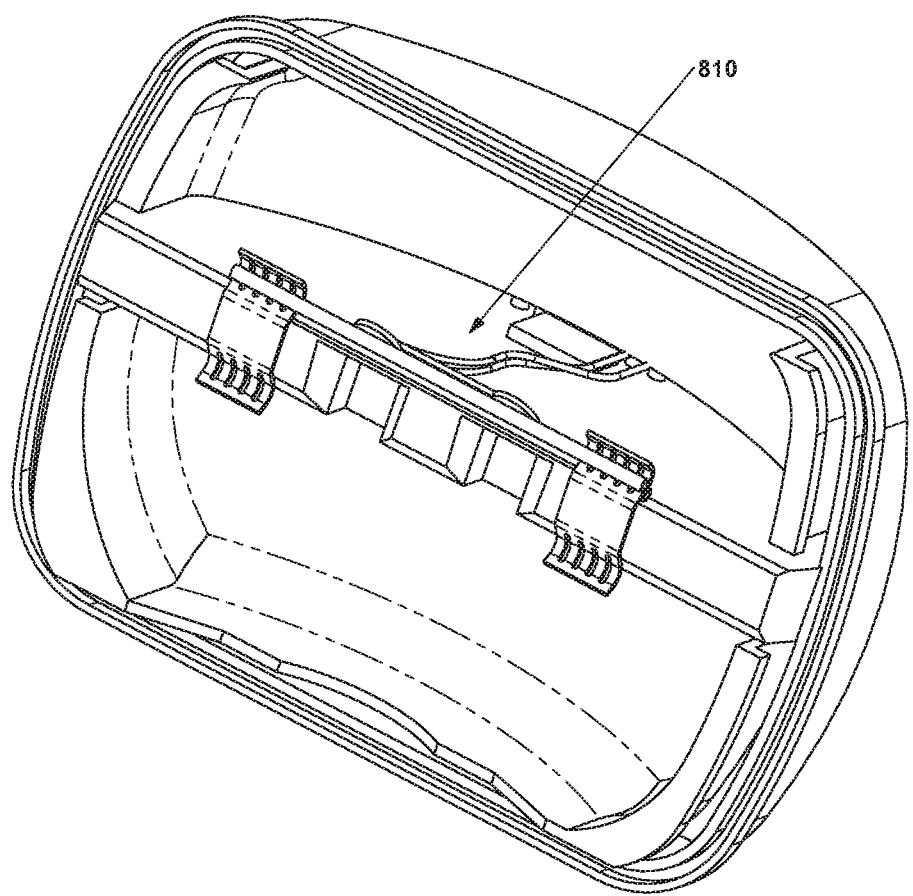
Figure 42:
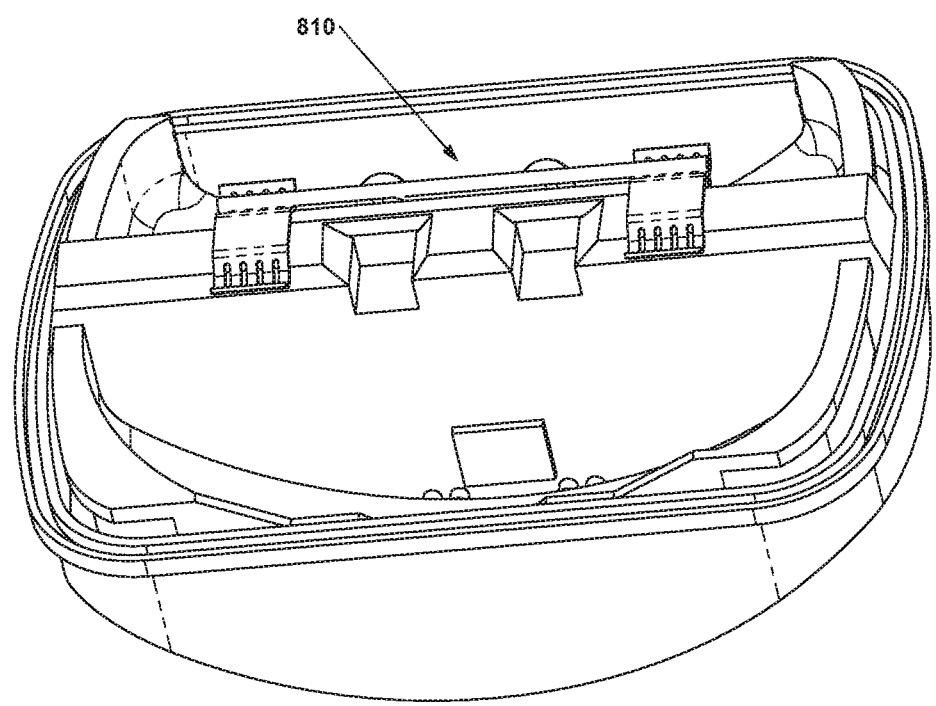
Figure 43:
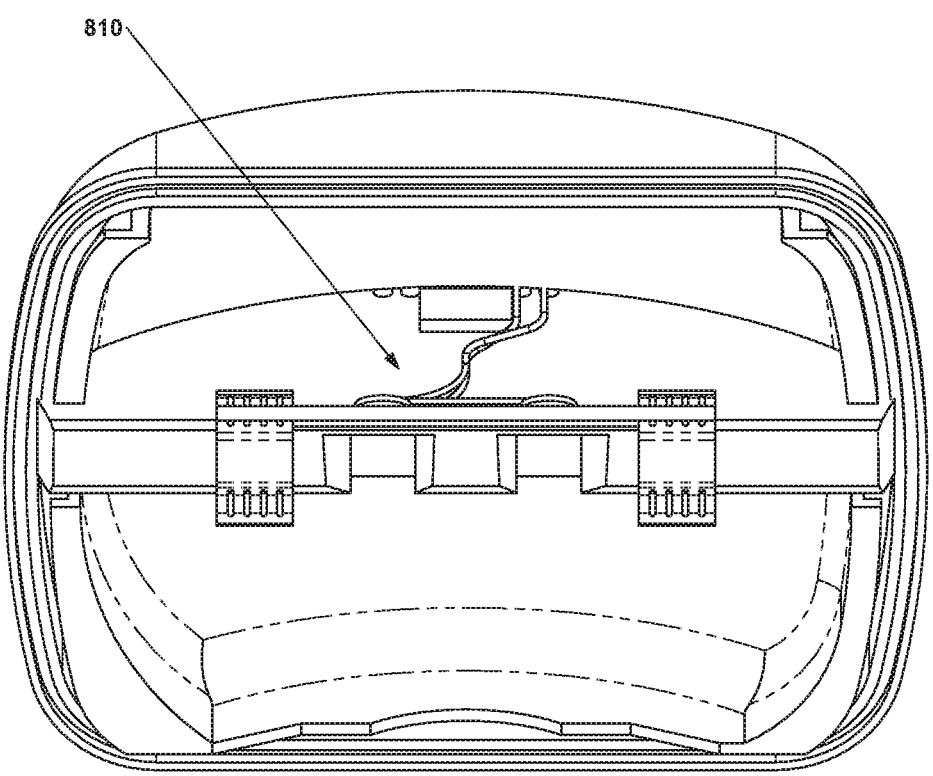
Figure 44:
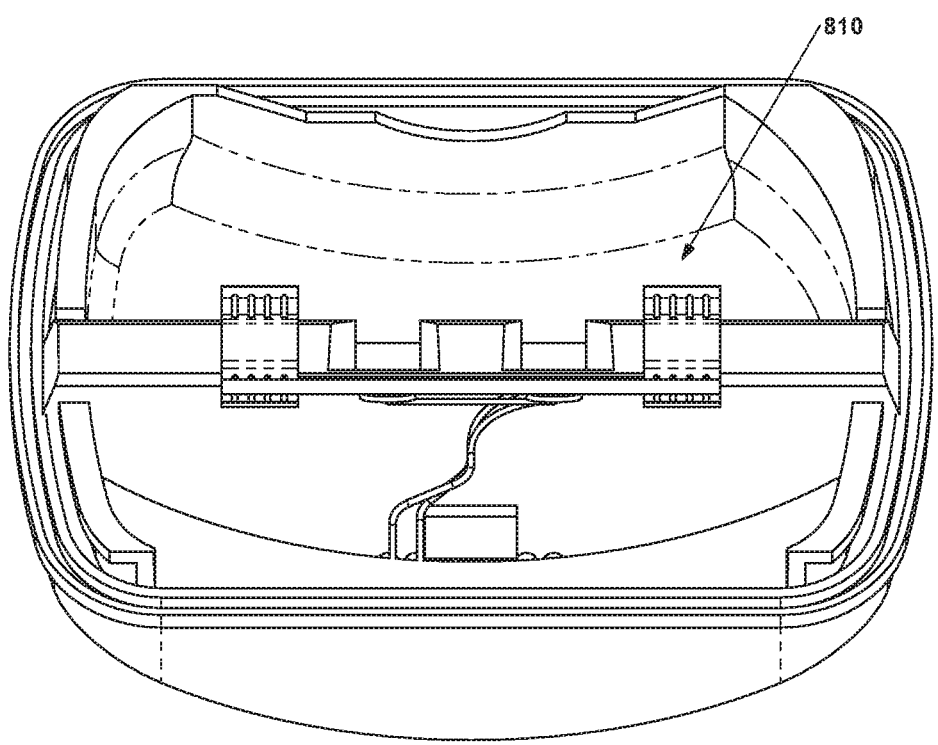
Figure 45:
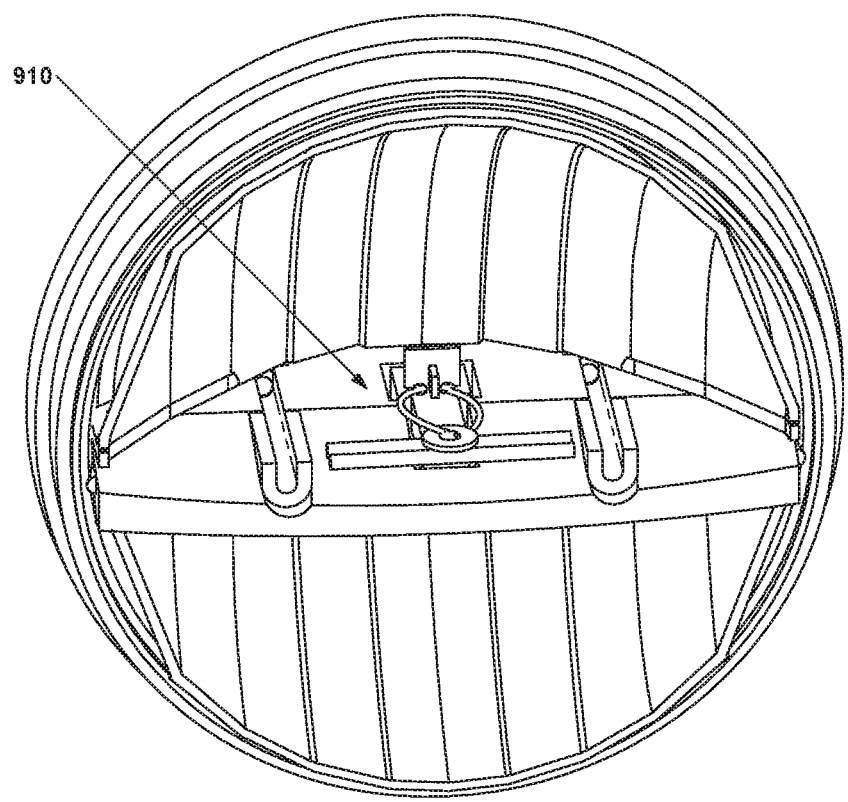

FIGS. 30, 32, 34 and 45 are partially disassembled perspective views of another unique heating source 910 using a centrally mounted PTC heater and a pair of I-shaped heat pipes. FIG. 34 illustrates three applications of unique heating sources on vehicle lights, sources 710, 910 and 110.

Figure 19:
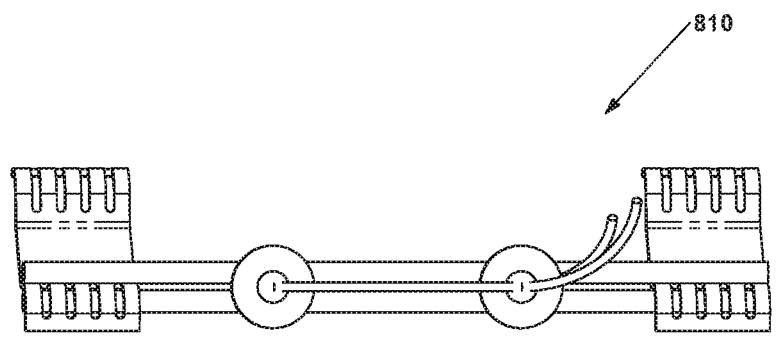
FIGS. 19-21 each are perspective views from above of an alternate geometric configuration heating source using a PTC heater with a heat sink and a pair of elongate, thermally conductive I-shaped heat pipes each additionally having a heat sink affixed at each end with a double-backed adhesive mounting strip.
Figure 20:
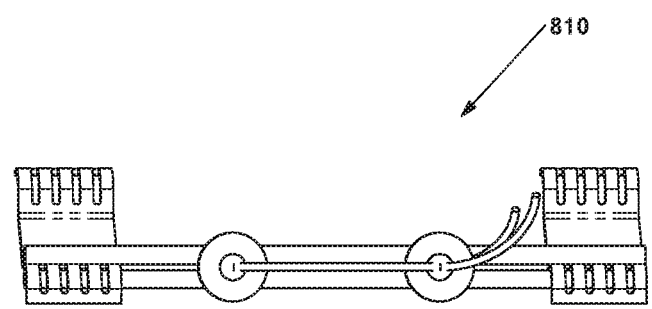
Figure 21:
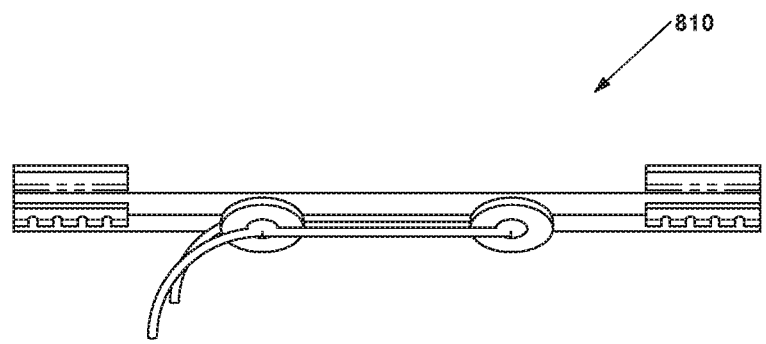

FIGS. 35-44 are partially disassembled perspective views of yet another unique heating source 810, shown in FIGS. 19-21, using a pair of PTC heaters affixed in spaced-apart relation along a medial portion of a pair of I-shaped heat pipes, with a heat sink affixed at each end of the pair of heat pipes.

Figure 46:
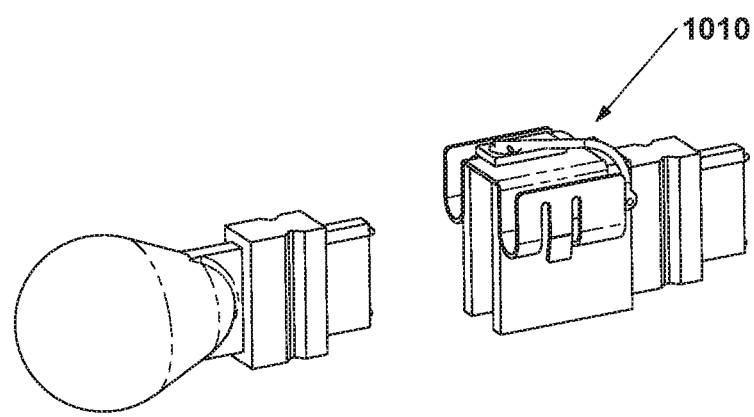
FIGS. 46-48 are perspective views of lamp and adapter assemblies having a unique heating source on either the lamp base or the adapter assembly.
Figure 47:
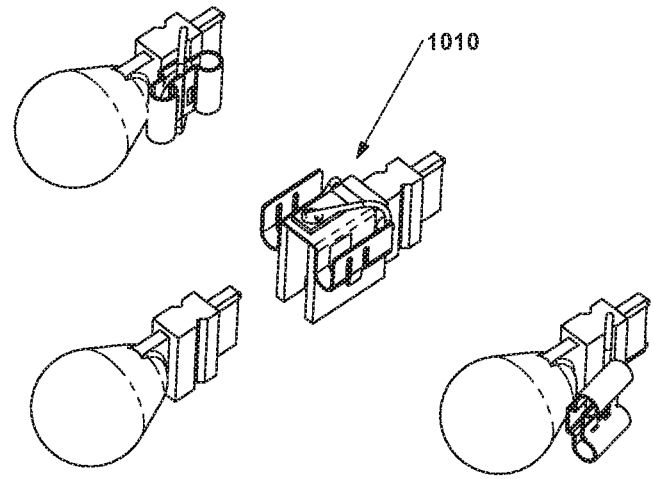
Figure 48:
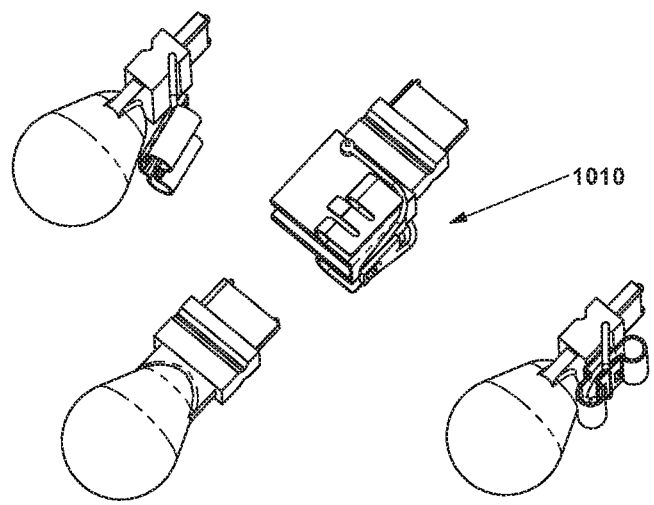

FIGS. 46-48 are perspective views of lamp and adapter assemblies having a unique heating source 1010 on either the lamp base or the adapter assembly. An aftermarket heated adaptor plug is provided for the clearing of snow and ice build up on headlight or taillight lenses. Such heating source 1010 can also be used to eliminate condensation buildup within a vehicle light assembly, from an inner surface of a lens. This plug is a male to female plug with a PTC (positive temperature coefficient) heater that self regulates its temperature based on the ambient temperature around it. Designed to plug into the existing light fixture outlet and then plug the stock light into it. No need for any modifications to the light or enclosure is necessary.

According to even another construction, a heated circular headlight was developed. A custom made heat sink was attached to the front corner of an LED mount board. The heat sink is made of two copper tubes on the PTC heating element side. The PTC heating element can be interchanged for different temperature ranges. Hollow copper tubes are used because copper pulls heat way from surfaces faster then aluminum. The copper tubes are attached to two small U-shaped aluminum heat sinks. Aluminum has a better radiant heat property than copper, so the combined benefits of copper and aluminum achieve a desired combined effect. With this combination, maximum heat transfer is achieved. The PTC heating element is connected in parallel with the top LED light source. This was done to simplify the circuitry. The only side effect of this configuration is that it takes three second for the top led to turn on. This results because the PTC heater initially has less resistance than the LED lamp, but the LED lamp stays on after the initial start up. Test results were collected in development with time laps pictures. The test environment was at −5 Degrees Fahrenheit. Testing was performed on this prototype design.

According to yet another construction, a heated tail light (both round and oblong) was developed. A power tie was provided before the voltage regulator circuit in the existing light hardware. An upgraded heat sink was used with the PTC element, which allows for maximum radiant heat to be achieved. FIGS. 3 and 4 provide exemplary data about the PTC heater and a power curve. When constructing these units, silver solder is used to withstand the rapid heat change and for a good connection. The PTC heaters that are used are a circular design, they are bi-directional so it does not matter what side to which the ground and power are connected. After connecting the wires to the heater, the heater is slid in between the heat sink with enough tension to hold them securely together. Lastly, the heat sink and the heater are secured inside to the bottom of the enclosure with a UV light cured adhesive.

The above-described PTC heater designs start with the perfect pairing of components for the enclosure. Depending on the cubic volume of the air required to be heated in order to transfer enough heat through the lens material, a specific heater design is selected. After knowing this, one can pick the right temperature constant for the application. Subsequently, the PTC heater is paired with the right heat sink that will not block any light and will fit in the allowed area. It is then necessary to make sure that the heat sink dissipates as much heat as possible to ensure a fast clear time. With the right selected components, it is now time to assemble them together. Depending on the distance the wires have to travel and the current they have to be able to carry, an appropriate conductive wire gauge is selected. Silver solder is used to ensure the best contact and heat resistance. The PTC heater is placed in the middle of the heat sink and one wire is soldered onto the back surface and the other wire is soldered on to the front surface. A ceramic square plate is used to separate the heat sink from the delicate electrical components to ensure that no harm results from over heating. With the heater assembled and the ceramic plate down, it is time to place the package at the bottom of the enclosure and secure it in place with a UV cured adhesive. The adhesive maximizes radiant heat transfer and also protects the heating unit from vibrations. Additionally and/or optionally, one or more fasteners can be used to secure the resulting package to a vehicle lighting component. Optionally, these constructions can be use on other light sources beyond just vehicle lighting, such as street lights, solar yard lights, and other security lights.

Figure 49:
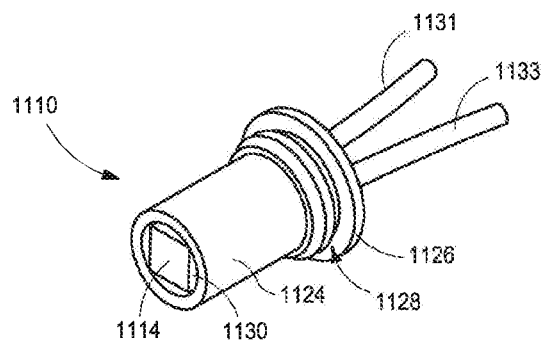
FIG. 49 is a perspective view from a leading end of a heater assembly for a vehicle light assembly according to even another unique version.
Figure 50:
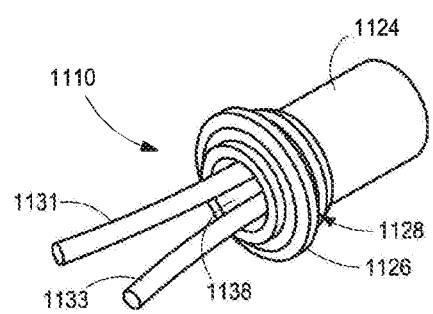
FIG. 50 is a perspective view of the heater assembly of FIG. 49 taken from a trailing end.

FIGS. 49 and 50 are perspective front and rear views of a heater assembly for a vehicle light assembly according to even another unique version. More particularly, FIG. 49 illustrates a heating source 1110 comprising a heating unit in the form of a positive temperature coefficient heater 1114 affixed in thermally conductive relation with thermally conductive adhesive 1130, such as thermally conductive epoxy, within a tubular heat sink 1124. A pair of insulated conductive leads 1131 and 1133 enter a rear portion of heat sink 1124 through a bore provided by cylindrical inner wall portion 1138, as shown in FIG. 50.

As shown in FIG. 49, PTC heater 1114 according to one construction has a square cross-section and has a length of approximately twice the distance of one side of the square face, extending longitudinally within heat pipe 1124. Heat pipe 1124 is formed from any of a number of thermally conductive materials, such as aluminum to facilitate transfer of heat generated by PTC heater 114 through heat sink, or projection 1124 into air (or gases) within the enclosure of a vehicle light. To facilitate assembly, a resilient rubber (or plastic) grommet, or mounting portion 1126 is affixed at a trailing end of heat pipe 1124, seated within a circumferentially reduced diameter portion, or groove, formed in an outer cylindrical surface of heat pipe 1124. An inner circumferential diameter of grommet, or receiver 1126 is urged into seated engagement within the groove of heat pipe 1124 during assembly. A radially inwardly extending circumferential groove 1128 is formed between two adjacent cylindrical walls on grommet 1126 with is urged and seated in assembly within a hole that is formed in a wall portion of a vehicle light assembly, or housing.

Such a tubular grommet construction readily facilitates modification of an existing vehicle light assembly to make the assembly heated by merely forming a hole in a housing wall portion of the light assembly and inserting a leading end of heating source 1110 through the hole until grommet 1128 overlies a circumferential edge of the hole, seating firmly within groove 1128 and sealing heating source 1110 within the hole provided in the light assembly housing. The provision of elongate heat sink, or tube 1124 enables close placement of a heat source in a desired location within a light assembly, proximate a lens of the light assembly. Heating source 1110 is a non-illuminating (no visible light) heat source. Furthermore, the heated illumination (or light) assembly provides a heated emitter assembly where an illumination assembly is one form of an electromagnetic wave source and the lens is one form of an electromagnetic wave transmission portion.

Figure 51:
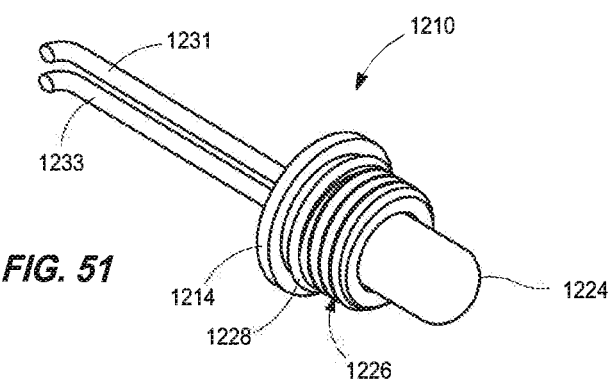
FIG. 51 is a perspective view from a leading end of another unique heater assembly for a vehicle light assembly.

FIG. 51 is a perspective view from a leading end of another unique heater assembly for a vehicle light assembly. More particularly, FIG. 51 illustrates a heating source 1210 having a positive temperature coefficient heater in the shape of a cylindrical disk to which a cylindrical nipple-shaped button or rod heat sink 1224 is affixed with thermally conductive adhesive, such as a thermally conductive epoxy. Heat sink 1224 is a cylindrical thermally conductive rod with a round, or semi-spherical nose, or leading end. Heat sink 1224 can be made of any suitable thermally conductive material, such as aluminum, metal, metal allow, composite or plastic material, or any other material having a desired thermal conductivity suitable to transfer heat from the PTC heater to an interior of a vehicle light assembly. A hollow threaded cylindrical collar, or mounting portion 1226 is further affixed with thermally conductive adhesive around heat sink 1224 and atop PTC heater 1214. Collar 1226 included a circumferential groove for receiving a rubber o-ring 1228 at the base of threaded portion 1226. A threaded bore or port is then provided through a wall portion of a housing for a vehicle light assembly, and heating source 1210 is threaded in sealed engagement within the port via threaded portion 1226 and o-ring seal 1228 as a leading end of heat sink 1224 is inserted within the housing of the vehicle light assembly at a location where it is desirable to generate heat to remove or prevent ice and/or condensation that might accumulated on a lens surface of a vehicle light assembly, either on an inner surface or an outer surface of a lens. The provision of elongate heat sink, or nipple 1224 enables close placement of a heat source in a desired location within a light assembly, proximate a lens of the light assembly.

Figure 52:
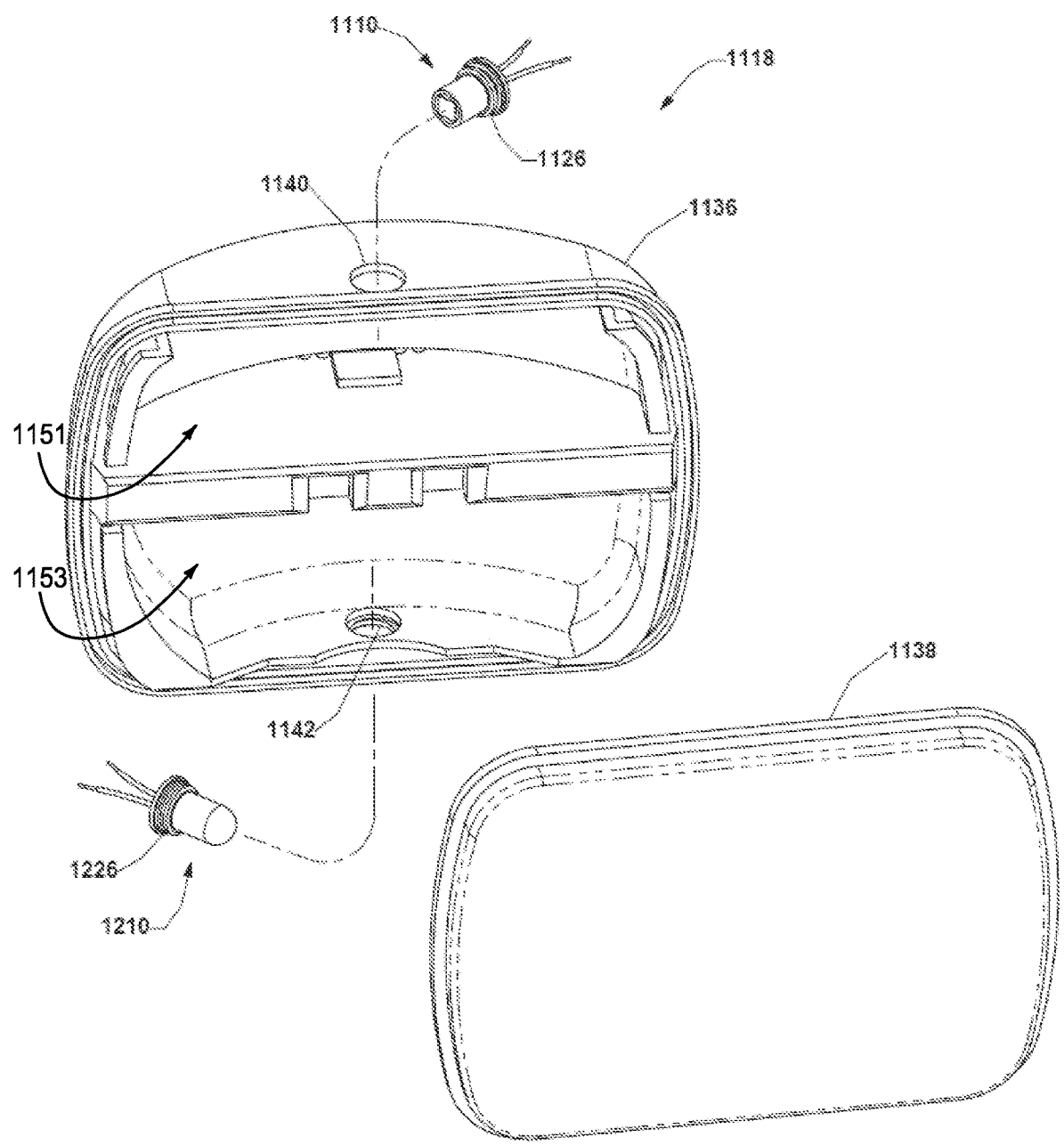
FIG. 52 is an exploded perspective view of a light assembly having heat sources installed in ports of the housing.

As shown in FIG. 52, a head light assembly 1118 is shown having each of heating sources 1110 and 1210 installed in holes, or ports 1140 and 1142 of housing 1136. Heating source 1110 is affixed in port 1140 with grommet 1126, whereas heating source 1210 is affixed in port 1142 via threaded cylindrical collar 1226. Light transmissible portion, or lens 1138 is then affixed about a periphery of housing 1136. Housing 1136 defines a pair of chambers 1151 and 1153 each communicating respectively with ports 1140 and 1142.

As understood by one of ordinary skill in the art, a light source, such as an LED is an emitter that provides an electromagnetic wave source in the form of light waves. A lens, or light transmissible portion of a housing is an electromagnetic wave transmission portion.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

I claim:

1. An illumination assembly, comprising:
   a housing forming an enclosure configured to contain an illumination source, the housing including a light transmission portion;
   a wall portion associated with the housing;
   a port provided in the wall portion;
   a projection disposed at least in part within the port and carried by the wall portion; and
   a non-illuminating heat source supported by the projection in heat transfer relation with at least one of the housing, the light transmission portion, and a gas within the enclosure of the housing.

2. The illumination assembly of claim 1, wherein the wall portion forms at least part of the housing.

3. The illumination assembly of claim 2, wherein the port is provided in the wall portion of the housing.

4. The illumination assembly of claim 1, where the port is a hole provided in the illumination assembly.

5. The illumination assembly of claim 4, wherein the port is located on the illumination assembly and the projection is carried by the port to generate heat sufficient to mitigate ice and/or condensation accumulation on a surface of the light transmissible portion.

6. The illumination assembly of claim 4, wherein the port is provided in the illumination assembly proximate the light transmissible portion.

7. The illumination assembly of claim 1, wherein the projection includes a mounting portion and the port is provided in the wall portion configured to receive the mounting portion.

8. The illumination assembly of claim 1, wherein the projection is configured to communicate with the non-illuminated heat source internally of the housing.

9. The illumination assembly of claim 1, wherein the projection extends at least in part within the enclosure.

10. The illumination assembly of claim 1, further comprising a receiver carried by the projection and configured to support the projection within the port.

11. The illumination assembly of claim 10, wherein the receiver is provided in communication with a chamber provided by the enclosure of the housing.

12. The illumination assembly of claim 1, wherein the port extends completely through the wall portion to provide an aperture.

13. The illumination assembly of claim 1, wherein the port provides a discontinuous surface disruption in the wall portion.

14. The illumination assembly of claim 1, wherein the wall portion is provided by the housing and the port extends completely through the wall portion.

15. An illumination assembly, comprising:
    a housing including a light transmission portion forming an enclosure configured to contain an illumination source;
    a wall portion associated with the housing;
    a hole provided in the wall portion;
    a projection operatively associated with the hole and carried by the wall portion; and
    a non-illuminating heat source supported by the projection in heat transfer relation with at least one of the housing, the light transmission portion, and a gas within the enclosure of the housing.

16. The illumination assembly of claim 15, wherein the wall portion is supported by the housing.

17. The illumination assembly of claim 16, wherein the wall portion is integrally formed by the housing.

18. The illumination assembly of claim 16, wherein the housing comprises the wall portion.

19. The illumination assembly of claim 15, wherein the projection is disposed at least in part within the hole carried by the housing.

20. The illumination assembly of claim 15, wherein the projection is in relation to the hole.

21. The illumination assembly of claim 20, wherein the projection is proximate the hole.

22. An illumination assembly, comprising:
- a housing including a light transmission portion forming an enclosure configured to contain an illumination source;
- a wall portion associated with the housing;
- a seat provided by the wall portion;
- a projection operatively associated with the seat and carried by the wall portion; and
- a non-illuminating heat source supported by the projection in heat transfer relation with at least one of the housing, the light transmission portion, and a gas within the enclosure of the housing.

23. The illumination assembly of claim 22, wherein the seat is provided by a periphery of a hole formed in the wall portion.

24. The illumination assembly of claim 22, wherein the wall portion forms at least part of the housing.

25. The illumination assembly of claim 22, wherein the seat comprises a peripheral proximate edge of a bore in the wall portion.

26. An emitter assembly, comprising:
- a housing including an electromagnetic wave transmission portion forming an enclosure configured to contain an electromagnetic wave source;
- a wall portion associated with the housing;
- a seat provided by the wall portion;
- a projection operatively associated with the wall portion; and
- a non-illuminating heat source supported by the projection in heat transfer relation with at least one of the housing, the electromagnetic wave transmission portion, and a gas within the enclosure of the housing.

27. The emitter assembly of claim 26, wherein the housing contains an electromagnetic wave source comprising a light source and the electromagnetic wave transmission portion of the housing is a light transmissive lens.

28. The emitter assembly of claim 26, further comprising an electromagnetic wave source contained within the housing, wherein the contained electromagnetic wave source is a directional source and the housing further comprises an electromagnetic wave reflector carried by the housing and configured to direct electromagnetic waves through the electromagnetic wave transmission portion of the housing.

29. The emitter assembly of claim 28, wherein the electromagnetic wave source is a light source emitting light within the housing and transmitted from the housing through a light transmissible portion of the housing providing the electromagnetic wave transmission portion.

30. The emitter assembly of claim 29, wherein the seat is an adjacent inner periphery about a port provided in the wall portion.

31. The emitter assembly of claim 30, further comprising a mounting portion carried by the projection and configured to affix the projection within the port of the housing.

32. The emitter assembly of claim 31, wherein the mounting portion further comprises a radially inwardly extending circumferential groove on a grommet affixed to a trailing end of the projection.

33. The emitter assembly of claim 31, wherein the mounting portion comprises a cylindrical threaded portion provided on the trailing end of the projection.

* * * * *